US011897182B2

(12) United States Patent
Tazawa

(10) Patent No.: US 11,897,182 B2
(45) Date of Patent: Feb. 13, 2024

(54) RESIN LAMINATED OPTICAL BODY AND METHOD FOR MANUFACTURING THE SAME

(71) Applicant: DEXERIALS CORPORATION, Tokyo (JP)

(72) Inventor: Hiroshi Tazawa, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 767 days.

(21) Appl. No.: 17/041,184

(22) PCT Filed: Feb. 27, 2019

(86) PCT No.: PCT/JP2019/007411
§ 371 (c)(1),
(2) Date: Sep. 24, 2020

(87) PCT Pub. No.: WO2019/187907
PCT Pub. Date: Oct. 3, 2019

(65) Prior Publication Data
US 2021/0094220 A1   Apr. 1, 2021

(30) Foreign Application Priority Data
Mar. 30, 2018   (JP) .................................. 2018-068744

(51) Int. Cl.
*G02B 1/118* (2015.01)
*B29C 59/02* (2006.01)

(52) U.S. Cl.
CPC .............. *B29C 59/02* (2013.01); *G02B 1/118* (2013.01)

(58) Field of Classification Search
CPC ....... G02B 1/118; G02B 3/0031; B29C 59/02; B29D 11/00365; B29D 11/00557
See application file for complete search history.

(56) References Cited

U.S. PATENT DOCUMENTS 7,885,018 B2 *  2/2011  Suzuki ................. G02B 13/006
                                                                  359/796
2010/0202060 A1 *  8/2010  Ando ............... B29D 11/00365
                                                                  425/363

(Continued)

FOREIGN PATENT DOCUMENTS

CN          1924616 A       3/2007
CN        101791836 A       8/2010

(Continued)

OTHER PUBLICATIONS

Dec. 28, 2021, Japanese Office Action issued for related JP Application No. 2018-068744.

(Continued)

*Primary Examiner* — Ryan D Howard
(74) *Attorney, Agent, or Firm* — Paratus Law Group, PLLC

(57) ABSTRACT

There is provided a novel and improved resin laminated optical body and a method for manufacturing the same that can easily adjust an optical property other than an optical property derived from a micro concave-convex structure, and eventually can reduce manufacturing costs of an optical device. The resin laminated optical body includes: an optical base material having a curved surface; and a resin layer provided on the curved surface of the optical base material. A micro concave-convex structure is formed in a surface of the resin layer, and the resin laminated optical body has a first optical property derived from the micro concave-convex structure and a second optical property derived from a property of the resin layer other than the micro concave-convex structure, the second optical property being different from an optical property of the optical base material.

12 Claims, 10 Drawing Sheets

(56) References Cited

U.S. PATENT DOCUMENTS

2013/0016278 A1  1/2013  Matsusaka et al.
2015/0060289 A1  3/2015  Saiki et al.

FOREIGN PATENT DOCUMENTS

| CN | 103003734 A | 3/2013 |
|---|---|---|
| EP | 2213447 A2 | 8/2010 |
| EP | 2711161 A1 | 3/2014 |
| JP | 2001-300944 A | 10/2001 |
| JP | 2006-039450 A | 2/2006 |
| JP | 2007-101661 A | 4/2007 |
| JP | 2008-213210 A | 9/2008 |
| JP | 2013-256015 A | 12/2013 |
| WO | WO 2013/047753 A1 | 4/2013 |
| WO | WO 2014/065136 A1 | 5/2014 |

OTHER PUBLICATIONS

Oct. 1, 2021, European Search Report issued for related EP application No. 19774832.0.
Mar. 30, 2023, Taiwanese Office Action issued for related TW Application No. 108107440.
Jan. 6, 2022, Chinese Office Action issued for related CN Application No. 201980022438.0.
Oct. 18, 2022, Japanese Office Action issued for related JP Application No. 2018-068744.
Aug. 10, 2022, Chinese Office Action issued for related CN Application No. 201980022438.0.
Apr. 19, 2022, Japanese Office Action issued for related JP Application No. 2018-068744.
Nov. 2, 2022, Taiwanese Office Action issued for related TW Application No. 108107440.

\* cited by examiner

RESIN LAMINATED OPTICAL BODY AND METHOD FOR MANUFACTURING THE SAME

CROSS REFERENCE TO PRIOR APPLICATION

This application is a National Stage Patent Application of PCT International Patent Application No. PCT/JP2019/007411 (filed on Feb. 27, 2019) under 35 U.S.C. § 371, which claims priority to Japanese Patent Application No. 2018-068744 (filed on Mar. 30, 2018), which are all hereby incorporated by reference in their entirety.

TECHNICAL FIELD

The present invention relates to a resin laminated optical body and a method for manufacturing the same.

BACKGROUND ART

In recent years, optical apparatuses (such as various image projecting devices and imaging devices, for example) including a large number of optical elements have been developed and have become popular. Reduction in size and weight of these optical apparatuses is strongly demanded from the perspectives of wearing on the human body and incorporation into an infrastructure such as various apparatuses or vehicles. In order to meet such a demand, technologies for combining a plurality of optical elements have been proposed as disclosed in Patent Literature 1 and Patent Literature 2, for example. Specifically, in Patent Literature 1 and Patent Literature 2, a resin layer having a micro concave-convex structure is combined in a surface of an optical lens. According to Patent Literature 1 and Patent Literature 2, the optical lens can be provided with an optical property derived from the micro concave-convex structure.

CITATION LIST

Patent Literature

Patent Literature 1: JP 2013-256015A
Patent Literature 2: JP 2001-300944A

SUMMARY OF INVENTION

Technical Problem

In this manner, the composite lens (obtained by combining the resin layer on the surface of the optical lens) disclosed in each of Patent Literature 1 and Patent Literature 2 has an optical property derived from the micro concave-convex structure. However, another optical property (for example, the focal length) of the composite lens is similar to that of an original optical lens. Thus, in order to adjust the other optical property, an optical lens different in the other optical property needs to be arranged on an optical path. Specifically, it is necessary to prepare a plurality of types of metal molds for producing an optical lens, and to produce an optical lens having a desired optical property using these metal molds. Therefore, a great deal of effort is required for adjusting the other optical property, which results in problems of increased device size and increased manufacturing costs of an optical device.

Therefore, the present invention was made in view of the above problems, and the present invention has an object to provide a novel and improved resin laminated optical body and a method for manufacturing the same that can not only provide an optical property derived from a micro concave-convex structure for an original optical base material, but also at the same time provide and easily adjust an optical property other than the optical property derived from the micro concave-convex structure, and eventually can save the space of an optical device and achieve reduction of manufacturing costs.

Solution to Problem

In order to achieve the above-mentioned object, according to an aspect of the present invention, there is provided a resin laminated optical body including: an optical base material having a curved surface; and a resin layer provided on the curved surface of the optical base material. A micro concave-convex structure is formed on a surface of the resin layer. The resin laminated optical body has a first optical property derived from the micro concave-convex structure and a second optical property derived from a property of the resin layer other than the micro concave-convex structure, the second optical property being different from an optical property of the optical base material.

Herein, the second optical property may be provided for the resin laminated optical body depending on a shape of the resin layer other than the micro concave-convex structure.

In addition, the resin layer may have a different thickness per region of the curved surface of the optical base material.

In addition, a ratio T between a minimum thickness and a maximum thickness of the resin layer may be smaller than 1.

In addition, the surface of the resin layer may be a curved surface, and a radius of curvature of the surface of the resin layer may be different from a radius of curvature of the curved surface of the optical base material.

In addition, a ratio R between the radius of curvature of the surface of the resin layer and the radius of curvature of the curved surface of the optical base material may be larger than 1.

In addition, a refractive index of the resin layer may be different from a refractive index of the optical base material.

In addition, the micro concave-convex structure may be any one or more types of a moth-eye structure, a light diffusing structure, a microlens array structure, and a diffraction grating structure.

According to another aspect of the present invention, there is provided a method for manufacturing a resin laminated optical body, including: a first step of preparing an optical base material having a curved surface; a second step of forming an uncured resin layer on the curved surface of the optical base material; a third step of preparing a flexible master having an inverted structure of a micro concave-convex structure formed on a surface and having flexibility; a fourth step of bringing the flexible master into proximity to the uncured resin layer; a fifth step of pressing the inverted structure of the flexible master against the uncured resin layer while applying a printing pressure to the flexible master to deform the flexible master; and a sixth step of curing the uncured resin layer in a state where the inverted structure of the flexible master is pressed against the uncured resin layer to form a resin layer on the curved surface of the optical base material. In the fifth step, the printing pressure is adjusted to adjust a shape of the resin layer other than the micro concave-convex structure. An optical property provided for the resin laminated optical body depending on the shape of the resin layer other than the micro concave-convex structure is different from an optical property of the optical base material.

Herein, in the fifth step, a distance between the surface of the flexible master and the curved surface of the optical base material may have a different value per region of the curved surface of the optical base material.

In addition, in the fifth step, the printing pressure may be adjusted to make a ratio between a minimum distance and a maximum distance between the surface of the flexible master and the curved surface of the optical base material have a value smaller than 1.

In addition, in the fifth step, the printing pressure may be adjusted to make a radius of curvature of the flexible master have a different value from a radius of curvature of the optical base material.

In addition, in the fifth step, the printing pressure may be adjusted to make a ratio between the radius of curvature of the flexible master and the radius of curvature of the optical base material have a value larger than 1.

In addition, a refractive index of the resin layer may be different from a refractive index of the optical base material.

In addition, the micro concave-convex structure may be any one or more types of a moth-eye structure, a light diffusing structure, a microlens array, and a diffraction grating.

Advantageous Effects of Invention

According to the present invention, as described above, the original optical base material can be provided with the first optical property derived from the micro concave-convex structure. Furthermore, by adjusting the property of the resin layer, the resin laminated optical body can be provided with the second optical property (that is, an optical property other than the optical property derived from the micro concave-convex structure) at the same time as the above-described first optical property. Therefore, in a case of intending to adjust the second optical property, it is not necessary to prepare a different optical base material for each second optical property. That is, it is not necessary to prepare a plurality of types of metal molds for the optical base material in order to adjust the second optical property. Therefore, the second optical property can be adjusted easily. Furthermore, by applying the resin laminated optical body to an optical device, the space of the optical device can be saved, and reduction of manufacturing costs can be achieved.

DESCRIPTION OF EMBODIMENTS

Figure 1:
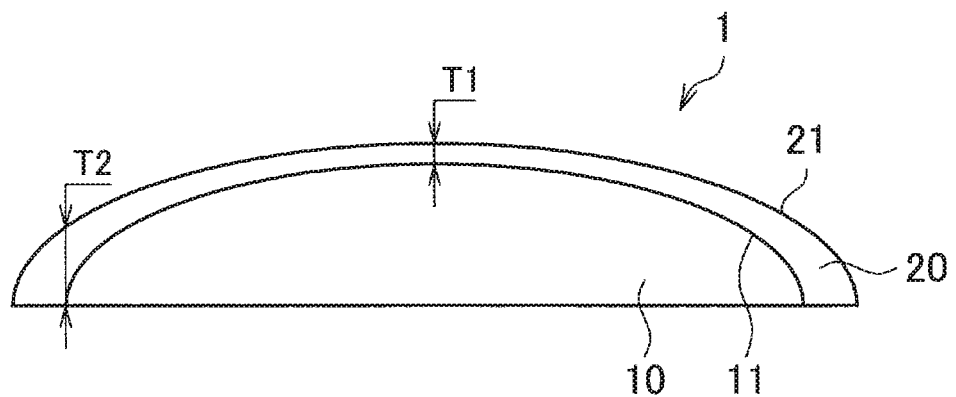
FIG. 1 is a cross-section diagram illustrating an example of a resin laminated optical body according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Configuration of Resin Laminated Optical Body>

Figure 2:
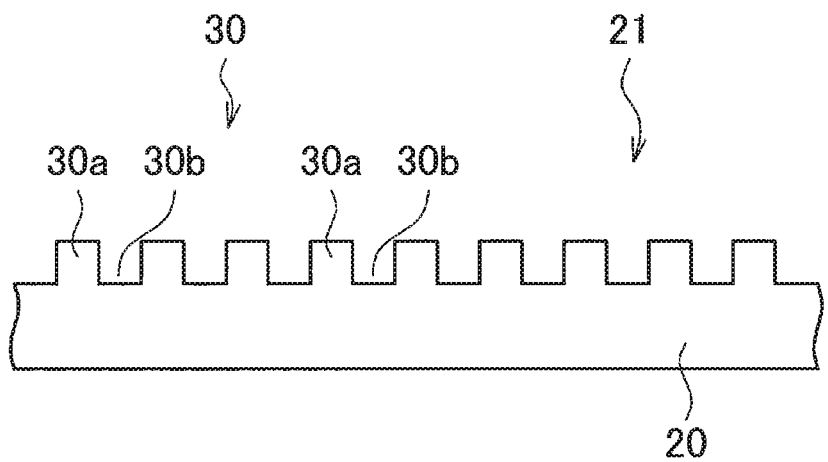
FIG. 2 is a cross-section diagram illustrating an example of a micro concave-convex structure formed on a surface of the resin laminated optical body according to the embodiment.

First, a configuration of a resin laminated optical body 1 according to the present embodiment will be described on the basis of FIG. 1 to FIG. 2. As illustrated in FIG. 1, the resin laminated optical body 1 includes an optical base material 10 and a resin layer 20. The optical base material 10 is a convex lens, and has a convex curved surface 11. Note that, in the example of FIG. 1, the optical base material 10 is a plano-convex lens (convex lens having a flat surface on one side), but may be a double-convex lens (convex lens having convex surfaces on both sides). The material of the optical base material 10 is not particularly restricted, but may be a material used for an optical lens. Examples of the material of the optical base material 10 include polycarbonate, acrylate, cycloolefin polymers, cycloolefin copolymers, polypropylene, glass, and the like. The material of the optical base material 10 may be selected as appropriate in accordance with the use and the like of the resin laminated optical body 1.

The curved surface 11 may be subjected to various types of pretreatment (treatment before laminating the resin layer 20 on the curved surface 11) in order to improve adhesion to the resin layer 20. Examples of such pretreatment include corona treatment, excimer treatment, UV ozone treatment, heat treatment, flame treatment (treatment of applying flame to the curved surface 11), solvent cleaning, primer applying treatment, and the like.

The resin layer 20 is provided on the curved surface 11 of the optical base material 10. A micro concave-convex structure 30 is formed on a surface 21 of the resin layer 20, as illustrated in FIG. 2. The micro concave-convex structure 30 includes large numbers of micro convexities 30a and micro concavities 30b. Specifically, the micro concave-convex structure 30 may be a moth-eye structure, light diffusing structure, microlens array structure, or diffraction grating structure, for example. In a case where the micro concave-convex structure 30 is the moth-eye structure, the micro convexities 30a or the micro concavities 30b are arrayed on the surface 21 at an average cycle less than or equal to a visible light wavelength. Accordingly, external light is restrained from reflecting off the surface 21. In a case where the micro concave-convex structure 30 has a light diffusing structure, the shape of the micro convexities 30a or the micro concavities 30b is adjusted such that light passing through the optical base material 10 and arrived at the micro concave-convex structure 30 is diffused and radiated to the outside. In a case where the micro concave-convex structure 30 is a microlens array structure, the micro convexities 30a or the micro concavities 30b are micron-order microlenses. In a case where the micro concave-convex structure 30 is a diffraction grating structure, the micro convexities 30a or the micro concavities 30b have the shape of diffraction grating. Obviously, the micro concave-convex structure 30 is not limited to the above-described examples. In addition, a plurality of types of structures cited above as examples may be mixed or arrayed on the surface 21 of the resin layer 20. Furthermore, the micro concave-convex structures 30 having the same type of pattern but adjusted to have different optical properties may be mixed or arrayed on the surface 21 of the resin layer 20. In a case of arranging the light diffusing structure on the surface 21 of the resin layer 20, for example, it is also possible to array structures having different diffusion properties at the central part and peripheral part of the surface 21 according to design necessity.

The resin layer 20 includes a cured curing resin. The cured curing resin is preferably transparent. The curing resin includes a polymerizable compound and a curing initiator. The polymerizable compound is a resin that is cured by the curing initiator. Examples of the polymerizable compound include a polymerizable epoxy compound and a polymerizable acrylic compound. A polymerizable epoxy compound is a monomer, oligomer, or prepolymer having one or multiple epoxy groups in the molecule. Examples of polymerizable epoxy compounds include various bisphenol epoxy resins (such as bisphenol A and F), novolac epoxy resin, various modified epoxy resins such as rubber and urethane, naphthalene epoxy resin, biphenyl epoxy resin, phenol novolac epoxy resin, stilbene epoxy resin, triphenol methane epoxy resin, dicyclopentadiene epoxy resin, triphenyl methane epoxy resin, and prepolymers of the above.

A polymerizable acrylic compound is a monomer, oligomer, or prepolymer having one or multiple acrylic groups in the molecule. Herein, monomers are further classified into monofunctional monomers having one acrylic group in the molecule, bifunctional monomers having two acrylic groups in the molecule, and multifunctional monomers having three or more acrylic groups in the molecule.

Examples of "monofunctional monomers" include carboxylic acids (acrylic acids or the like), hydroxy monomers (2-hydroxyethyl acrylate, 2-hydroxypropyl acrylate, 4-hydroxybutyl acrylate), alkyl or alicyclic monomers (isobutyl acrylate, t-butyl acrylate, isooctyl acrylate, lauryl acrylate, stearyl acrylate, isobornyl acrylate, cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylamino ethyl acrylate, N,N-dimethylamino propyl acrylamide, N,N-dimethyl acrylamide, acryloyl morpholine, N-isopropyl acrylamide, N,N-diethyl acrylamide, N-vinylpyrrolidone, 2-(perfluorooctyl)ethyl acrylate, 3-perfluorohexyl-2-hydroxypropyl acrylate, 3-perfluorooctyl-2-hydroxypropyl-acrylate, 2-(perfluorodecyl)ethyl-acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of "bifunctional monomers" include tri(propylene glycol) di-acrylate, trimethylolpropane-diaryl ether, and urethane acrylate.

Examples of "multifunctional monomers" include trimethylolpropane tri-acrylate, dipentaerythritol penta- and hexa-acrylate, and ditrimethylolpropane tetra-acrylate.

Examples other than the polymerizable acrylic compounds listed above include acrylmorpholine, glycerol acrylate, polyether acrylates, N-vinylformamide, N-vinylcaprolactone, ethoxy diethylene glycol acrylate, methoxy triethylene glycol acrylate, polyethylene glycol acrylate, ethoxylated trimethylolpropane tri-acrylate, ethoxylated bisphenol A di-acrylate, aliphatic urethane oligomers, and polyester oligomers.

By adjusting the type, compounding ratio, and the like of constitutional units of the curing resin, that is, a monomer, an oligomer, or a prepolymer, the properties of the resin layer 20, for example, the refractive index, viscosity, and the like can be adjusted.

The curing initiator is a material that cures the curing resin. Examples of the curing initiator include thermal curing initiators and light-curing initiators, for example. The curing initiator may also be one that cures by some kind of energy beam other than heat or light (for example, an electron beam) or the like. In the case in which the curing initiator is a thermal curing initiator, the curing resin is a thermosetting resin, whereas in the case in which the curing initiator is a light-curing initiator, the curing resin is a light-curing resin.

Herein, from the perspective of transparency of the resin layer 20, the curing initiator preferably is an ultraviolet-curing initiator. An ultraviolet-curing initiator is a type of light-curing initiator. Examples of ultraviolet-curing initiators include 2,2-dimethoxy-1,2-diphenylethane-1-one, 1-hydroxy-cyclohexyl phenyl ketone, and 2-hydroxy-2-methyl-1-phenyl propane-1-one. Consequently, the curing resin preferably is an ultraviolet-curing resin. From the perspective of transparency, the curing resin more preferably is an ultraviolet-curing acrylic resin.

The above-described curing resin can be selected and adjusted as appropriate in accordance with optical properties of materials constituting the optical base material 10 and an optical design of the device. For example, not only by using a curing resin having a refractive index equivalent to that of the optical base material 10 to change the curvature and adjust the focal length, but also by using a curing resin having a wavelength dispersion property with a refractive index different from that of the optical base material 10, the effects of adjusting the focal length and aberration property can be expected. In this manner, the resin laminated optical body 1 can also be provided with optical properties different from the optical properties of the optical base material 10 depending on the material of the curing resin.

The resin laminated optical body 1 has the resin layer 20 described above, and thus has a first optical property (for example, an antireflection property) derived from the micro concave-convex structure 30. The resin laminated optical body 1 further has a second optical property different from the optical property of the optical base material 10.

Herein, the second optical property is provided for the resin laminated optical body 1 in accordance with a property (for example, shape, refractive index, or the like) of the resin layer 20 other than the micro concave-convex structure 30. More specifically, as illustrated in FIG. 1, the resin layer 20 has a different thickness per region of the curved surface 11 of the optical base material 10. More specifically, a thickness T1 on the optical axis (central axis) of the optical base material 10 is minimum, and a thickness T2 on the outer edge is maximum. That is, a ratio T1/T2 (hereinafter, also referred to as a "thickness ratio T") between the minimum thickness T1 and the maximum thickness T2 of the resin layer 20 is smaller than 1. The method for measuring the thicknesses will be described later.

Therefore, the surface 21 of the resin layer 20 is a curved surface, and the radius of curvature of the surface 21 is different from the radius of curvature of the curved surface 11 of the optical base material 10. More specifically, the radius of curvature of the surface 21 is larger than the radius of curvature of the curved surface 11 of the optical base material 10. That is, a ratio R1/R2 (hereinafter, also referred to as a "curvature radius ratio R") between a radius of curvature R1 of the surface 21 of the resin layer 20 and a radius of curvature R2 of the curved surface 11 of the optical base material 10 is larger than 1.

Herein, as described above, the surface 21 of the resin layer 20 is not flat since the micro concave-convex structure 30 is formed therein. Thus, the radius of curvature of the surface 21 of the resin layer 20 and the thickness of the resin layer 20 are measured by the following method, for example. The cross section at the center of the resin laminated optical body 1 (the cross section passing through and being parallel to the optical axis) is observed. Then, the obtained curve of the surface 21 is subjected to curve fitting by the least squares method. Accordingly, the curve of the surface 21 is acquired, and the radius of curvature of the surface 21 is calculated on the basis of this curve.

Furthermore, the cross section at the center of the optical base material 10 (that is, before processing) (the cross section passing through and being parallel to the optical axis) is observed, and an obtained image is compared with the cross section at the center of the resin laminated optical body 1 to specify a region of the resin layer 20. Then, the distance from the curve of the surface 21 obtained by curve fitting described above to the curve of the curved surface 11 is determined as the thickness of the resin layer 20. The thickness of the resin layer 20 is measured per region of the resin layer 20.

Examples of a measurement device to be used for measuring the radius of curvature and thickness include various types of three-dimensional measuring equipment (for example, the three-dimensional measuring equipment UA3P made by Panasonic Corporation). In examples which will be described later, the radius of curvature and thickness were measured by the above-described method.

Therefore, in the example of FIG. 1, the focal length (or aberration property) of the resin laminated optical body 1 is different from the focal length (or aberration property) of the optical base material 10. Therefore, the focal length (or aberration property) is the second optical property. Obviously, the second optical property is not limited to this example, but may be anything that is provided for the resin laminated optical body 1 depending on the shape of the resin layer 20. That is, in the present embodiment, the resin laminated optical body 1 can be provided with the second optical property by adjusting the shape of the resin layer 20. Note that the second optical property is what is called a geometrical optics property in many cases as it is provided for the resin laminated optical body 1 depending on the shape of the resin layer 20.

In addition, the second optical property is not necessarily limited to one provided for the resin laminated optical body 1 depending on the shape of the resin layer 20. For example, by making the refractive index (more specifically, the refractive index after curing) of the resin layer 20 have a different value from the refractive index of the optical base material 10, the resin laminated optical body 1 can be provided with the second optical property (specifically, the focal length or aberration property). In this case, the radius of curvature of the surface 21 of the resin layer 20 may be the same as, but preferably is different from, the radius of curvature of the optical base material 10.

In this manner, in the present embodiment, the original optical base material 10 can be provided with the first optical property derived from the micro concave-convex structure 30. Furthermore, by adjusting the property (specifically, the shape, refractive index, or the like) of the resin layer 20, the second optical property (for example, the focal length or aberration property) can be provided for the resin laminated optical body 1 at the same time as the above-described first optical property. More specifically, by adjusting the radius of curvature or refractive index of the resin layer 20, the focal length or aberration property of the resin laminated optical body 1 can be adjusted. Therefore, in the case of intending to adjust the second optical property, it is not necessary to prepare a different optical base material 10 for each second optical property. That is, it is not necessary to prepare a plurality of types of metal molds for the optical base material 10 in order to adjust the second optical property. Therefore, the second optical property can be adjusted easily. Furthermore, by applying the resin laminated optical body 1 to an optical device, the space of the optical device can be saved, and reduction of manufacturing costs can be achieved.

Figure 3:
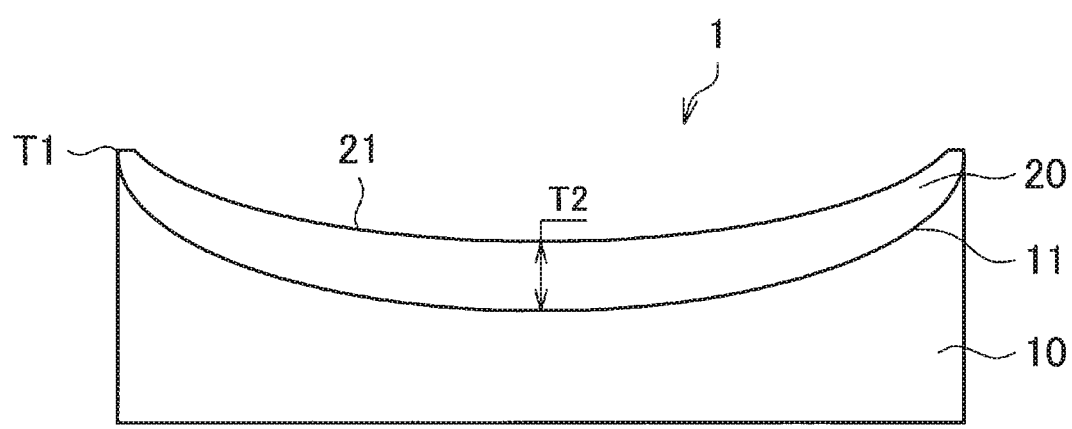
FIG. 3 is a cross-section diagram illustrating another example of the resin laminated optical body.

Note that the optical base material 10 is a convex lens in the example of FIG. 1, but may obviously be a concave lens as illustrated in FIG. 3. That is, the optical base material 10 may be anything that has the curved surface 11. In FIG. 3, the optical base material 10 is a plano-concave lens (concave lens having a flat surface on one side), but may be a double-concave lens (concave lens having concave surfaces on both sides). In this example, the micro concave-convex structure 30 is also formed on the surface of the resin layer 20. Furthermore, the resin layer 20 has a different thickness per region of the curved surface 11 of the optical base material 10. More specifically, the thickness T2 on the optical axis (central axis) of the optical base material 10 is maximum, and the thickness T1 on the outer edge is minimum. That is, the thickness ratio T is smaller than 1.

Therefore, the surface 21 of the resin layer 20 is a curved surface, and the radius of curvature of the surface 21 is larger than the radius of curvature of the curved surface 11 of the optical base material 10. That is, the curvature radius ratio R is larger than 1.

<2. Method for Manufacturing Resin Laminated Optical Body>

The resin laminated optical body 1 can be produced by what is called an imprinting method. Hereinafter, a method for manufacturing the resin laminated optical body 1 will be described in detail on the basis of FIG. 4 to FIG. 8. Note that in the example of FIG. 4 to FIG. 8, the optical base material 10 is a double-convex lens.

(2-1. First Step)

First, the optical base material 10 described above is prepared.

(2-2. Second Step)

Figure 4:
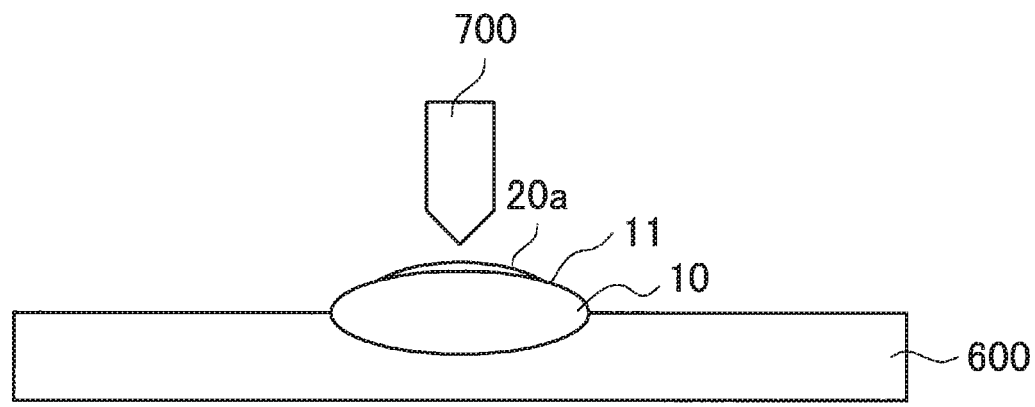
FIG. 4 is a cross-section diagram for describing a method for manufacturing the resin laminated optical body.

Then, as illustrated in FIG. 4, the optical base material 10 is set on an optical base material fixing jig 600. Then, the curved surface 11 (herein, the convex surface on one side) of the optical base material 10 is coated with an uncured curing resin using an applicator device 700. Accordingly, an uncured resin layer 20a is formed on the curved surface 11 of the optical base material 10. Herein, the refractive index of the curing resin may be different from the refractive index of the optical base material 10. The type of the applicator device 700 is not particularly limited, and may be a spin coater, a dispenser, an ink jet device, or the like, for example. The type of the applicator device 700 should only be selected depending on the properties or the like of the uncured resin layer 20a. In order to adjust adhesion of the uncured resin layer 20a to the optical base material 10, viscosity of the uncured resin layer 20a, or the like, the optical base material 10 may be heated before or during coating. In addition, the uncured resin layer 20a may be subjected to heat treatment after coating depending on the type of the uncured resin layer 20a. Note that the applicator device 700 may be incorporated into a chamber device 500 which will be described later, or may be separate from the chamber device 500.

(2-3. Third Step)

Figure 5:
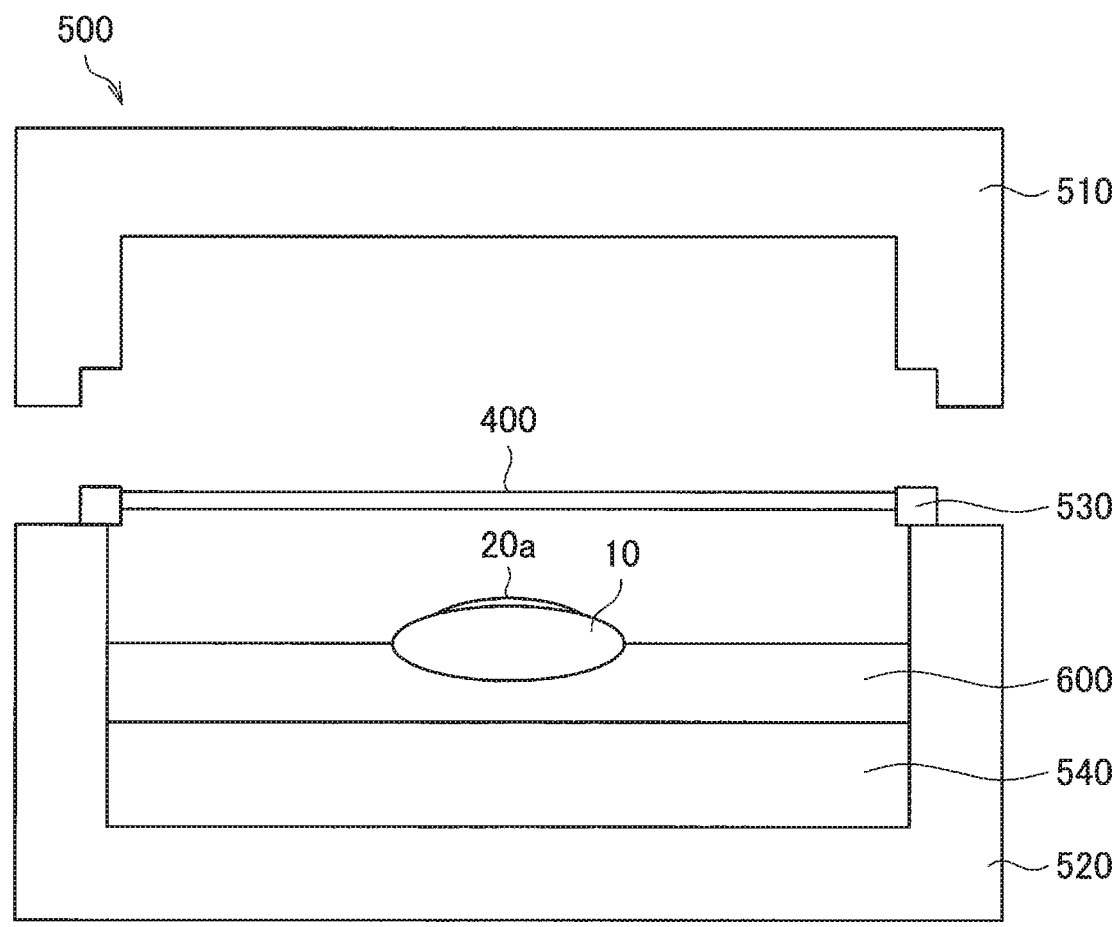
FIG. 5 is a cross-section diagram for describing the method for manufacturing the resin laminated optical body.
Figure 13:
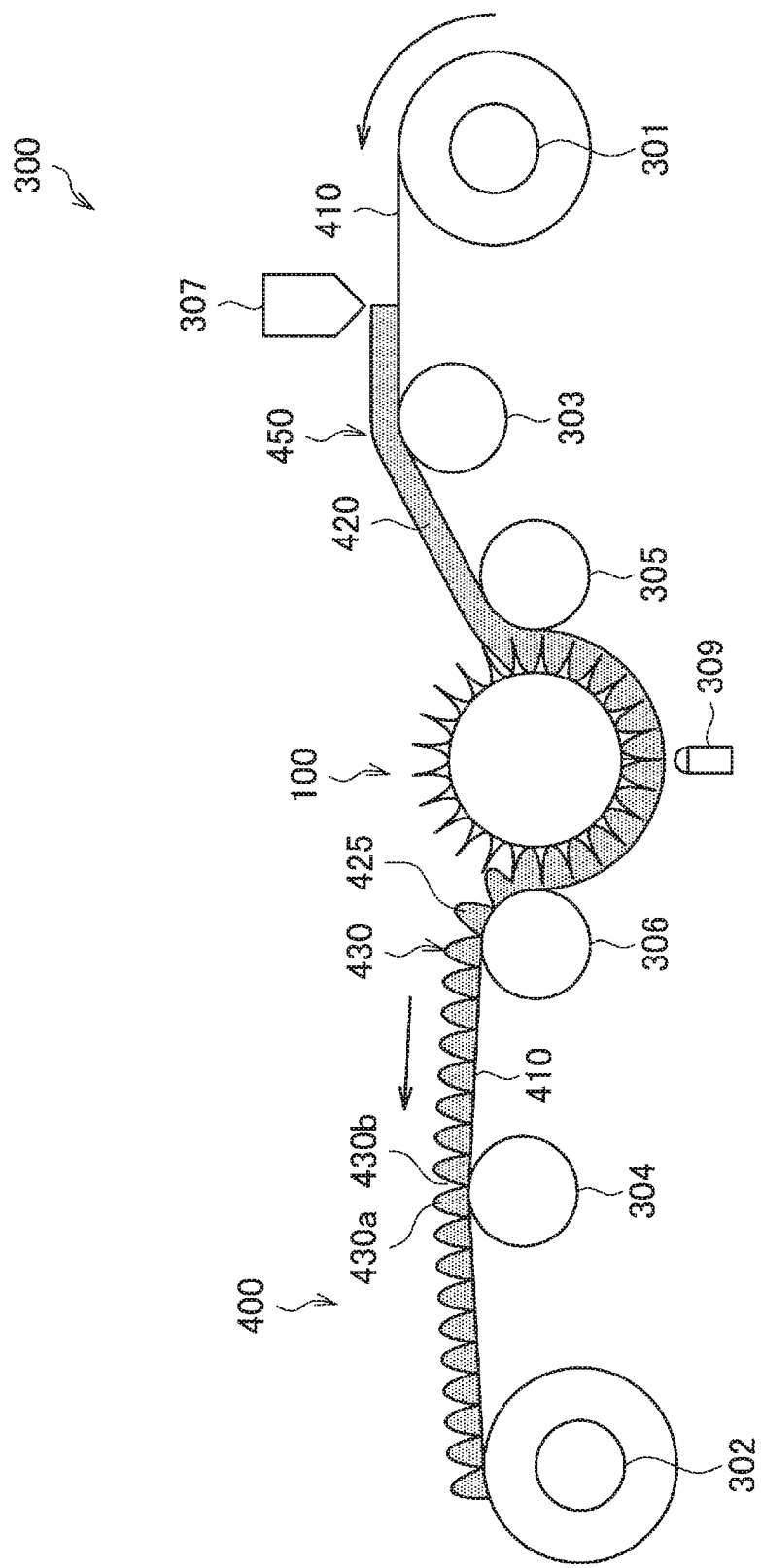
FIG. 13 is a schematic diagram illustrating an example of a transfer device that manufactures a flexible master by roll-to-roll.

In a third step, a flexible master 400 illustrated in FIG. 5 is prepared. Herein, the flexible master 400 is a film having flexibility, and an inverted structure (hereinafter, also referred to as an "inverted concave-convex structure 430") of the micro concave-convex structure 30 is formed on the surface thereof. The flexible master 400 may also be referred to as a soft mold. The inverted concave-convex structure 430 is illustrated in FIG. 13. A method for manufacturing the flexible master 400 will be described later. The third step should only be performed at least before a fourth step which will be described later is performed.

(2-4. Fourth Step)

A fourth step includes a step of setting the optical base material and the flexible master, and an optical base material approaching step.

(Step of Setting Optical Base Material and Flexible Master)

As illustrated in FIG. 5, the optical base material fixing jig 600 and the optical base material 10 are set in the chamber device 500. Herein, the chamber device 500 is a hollow device, and has an upper chamber box 510, a lower chamber box 520, a film fixing jig 530, and a movable table 540. The upper chamber box 510 is a box-shaped member which is open downward, and the lower chamber box 520 is a box-shaped member which is open upward.

A vacuum pump or pneumatic pump is connected to the upper chamber box 510 and the lower chamber box 520, and can bring the inner space of each of them into a negative pressure or positive pressure state. Herein, when bringing the space in each of the chamber boxes into the positive pressure state, various fluids are introduced into the space in each of the chamber boxes. Herein, examples of the fluids include gas such as air, but may be a liquid. A specific value of a pressure in each of the chamber boxes and a time for holding such a pressure can be adjusted arbitrarily. In addition, a UV radiation device not shown is provided in the upper chamber box 510. The UV radiation device may be provided in the lower chamber box 520. The UV intensity and radiation time can be adjusted arbitrarily. Note that this example is premised on the use of an ultraviolet-curing resin as the uncured resin layer 20a, whilst in a case of using another type of curing resin, a device for curing the curing resin should only be provided in the upper chamber box 510 or the lower chamber box 520. In addition, each of the chamber boxes may be provided with a heating device. The film fixing jig 530 is a jig for fixing the flexible master 400 which will be described later to the open face of the lower chamber box 520. The movable table 540 is arranged in the lower chamber box 520, and can be moved vertically by a driving device not shown.

Specifically, the optical base material 10 is set on the movable table 540 together with the optical base material fixing jig 600. Then, the flexible master 400 is fixed to the film fixing jig 530. The open face of the lower chamber box 520 is closed by the flexible master 400. The flexible master 400 is fixed to the film fixing jig 530 in such a manner that the inverted concave-convex structure 430 faces the optical base material 10.

(Optical Base Material Approaching Step)

Figure 6:
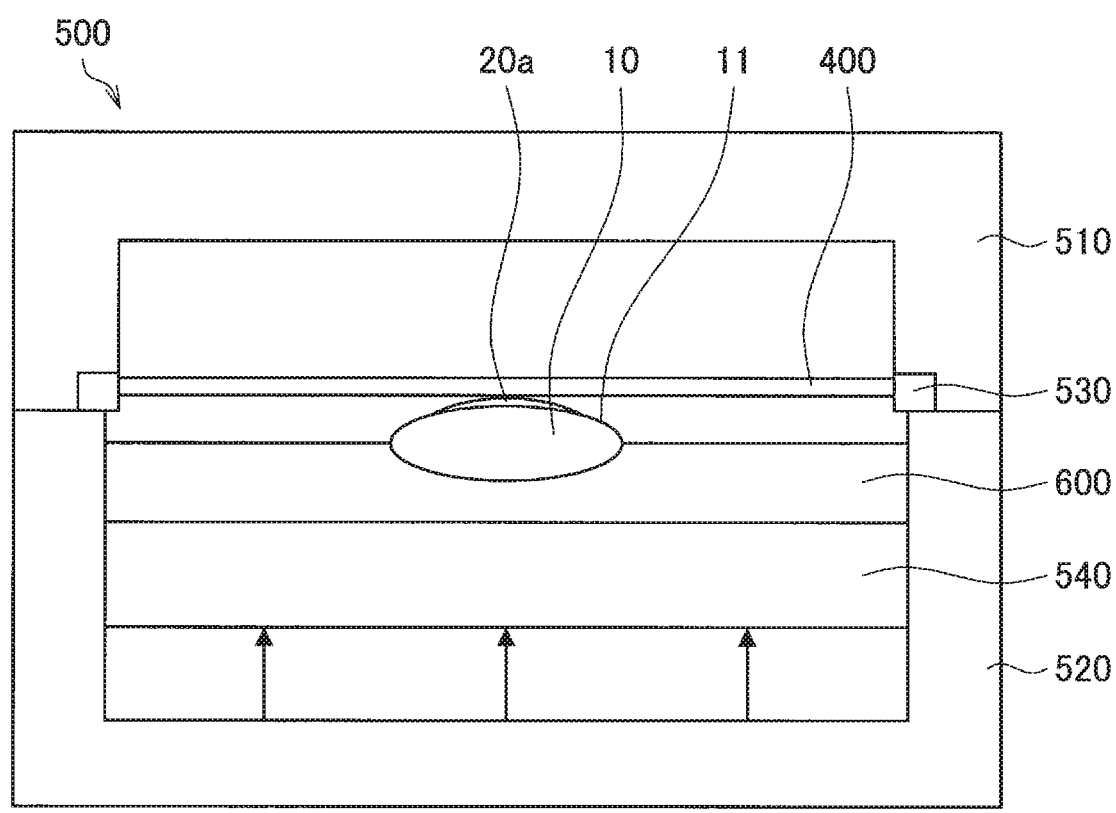
FIG. 6 is a cross-section diagram for describing the method for manufacturing the resin laminated optical body.
Figure 7:
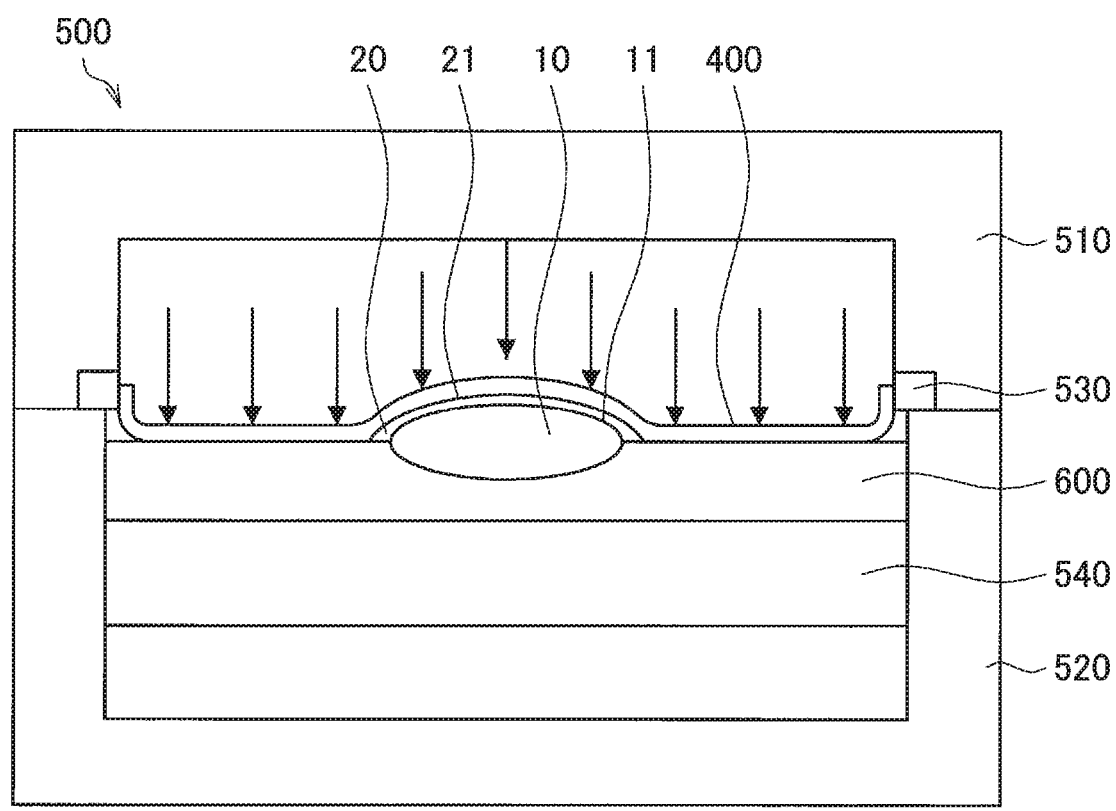
FIG. 7 is a cross-section diagram for describing the method for manufacturing the resin laminated optical body.

Then, as illustrated in FIG. 6, the upper chamber box 510 and the lower chamber box 520 are coupled to each other. Accordingly, the space in the chamber device 500 is sealed. On this occasion, the temperature in the chamber device 500 may be raised. Then, the space in the chamber device 500 is evacuated. Then, the movable table 540 is lifted to bring the flexible master 400 and the optical base material 10 into proximity to each other. The distance between the flexible master 400 and the optical base material 10 should only be adjusted as appropriate in accordance with the shape or the like of the optical base material 10. Arrows in FIG. 6 indicate the direction in which the movable table 540 is moved.

(2-5. Fifth Step (Pressing Step))

Then, a fluid is introduced into the upper chamber box 510 to bring the space in the upper chamber box 510 into the positive pressure state. A printing pressure is thereby applied to the flexible master 400. Arrows in FIG. 7 indicate the direction of the printing pressure. Through this step, the inverted concave-convex structure 430 of the flexible master 400 is pressed against the uncured resin layer 20a while deforming the flexible master 400. Accordingly, the uncured resin layer 20a spreads across the curved surface 11 (the convex surface on one side), and the uncured resin layer 20a enters between micro-convexities of the inverted concave-convex structure 430. Herein, it is preferable not to leave a gap between the uncured resin layer 20a and the flexible master 400 whenever possible. This is because, if a gap is left, a phenomenon such as entry of air bubbles or insufficient transfer of the inverted concave-convex structure 430 to the resin layer 20 is likely to occur.

(2-6. Sixth Step (Curing Step))

Then, the uncured resin layer 20a is cured in this state. Specifically, the uncured resin layer 20a is irradiated with ultraviolet rays. Accordingly, the uncured resin layer 20a becomes the resin layer 20, and the inverted concave-convex structure 430 is transferred to the surface of the resin layer 20. That is, an inverted structure of the inverted concave-convex structure 430, that is, the micro concave-convex structure 30 is formed in the surface 21 of the resin layer 20. Through the above steps, the resin laminated optical body 1 is produced.

Herein, in the present embodiment, by adjusting the printing pressure to be applied to the flexible master 400, a shape of the resin layer 20 other than the micro concave-convex structure 30 is adjusted. Specifically, the distance between the surface of the flexible master 400 (the surface in which the inverted concave-convex structure 430 is formed) and the curved surface 11 of the optical base material 10 shall have a different value per region of the curved surface 11 of the optical base material 10. More specifically, the ratio between the minimum distance and the maximum distance between the surface of the flexible master 400 and the curved surface 11 of the optical base material 10 shall have a value smaller than 1.

More specifically, the radius of curvature of the flexible master 400 shall have a different value from the radius of curvature of the optical base material 10. More specifically, the radius of curvature of the flexible master 400 is made larger than the radius of curvature of the optical base material 10. That is, the ratio between the radius of curvature of the surface of the flexible master 400 and the radius of curvature of the curved surface 11 of the optical base material 10 is made larger than 1.

Accordingly, the resin layer 20 can be provided with the above-described shape. That is, the thickness of the resin layer 20 can have a different value per region of the curved surface 11 of the optical base material 10. More specifically, the thickness T1 of the optical base material 10 on the optical axis (central axis) can be minimized, and the thickness T2 on the outer edge can be maximized That is, the thickness ratio T can be made smaller than 1.

More specifically, the surface 21 of the resin layer 20 can be made a curved surface, and the radius of curvature of the surface 21 can be made larger than the radius of curvature of the curved surface 11 of the optical base material 10. That is, the curvature radius ratio R can be made larger than 1.

Note that, as indicated in examples which will be described later, the thickness ratio T and the curvature radius ratio R both approach one as the printing pressure applied to the flexible master 400 increases. That is, the shape of the surface 21 of the resin layer 20 approaches the shape of the curved surface 11 of the optical base material 10. A specific range of the printing pressure should only be adjusted in accordance with the flexibility of the flexible master 400, the curing resin constituting the uncured resin layer 20a, and the like, and may be 0.1 MPa to 1.0 MPa as an example. Note that, as indicated in the examples which will be described later, the radius of curvature of the surface 21 of the resin layer 20 can also be adjusted by adjusting the viscosity of the uncured resin layer 20a, the thickness of a flexible base material 410 constituting the flexible master 400, and the like.

(2-7. Seventh Step (Separation Step))

Figure 8:
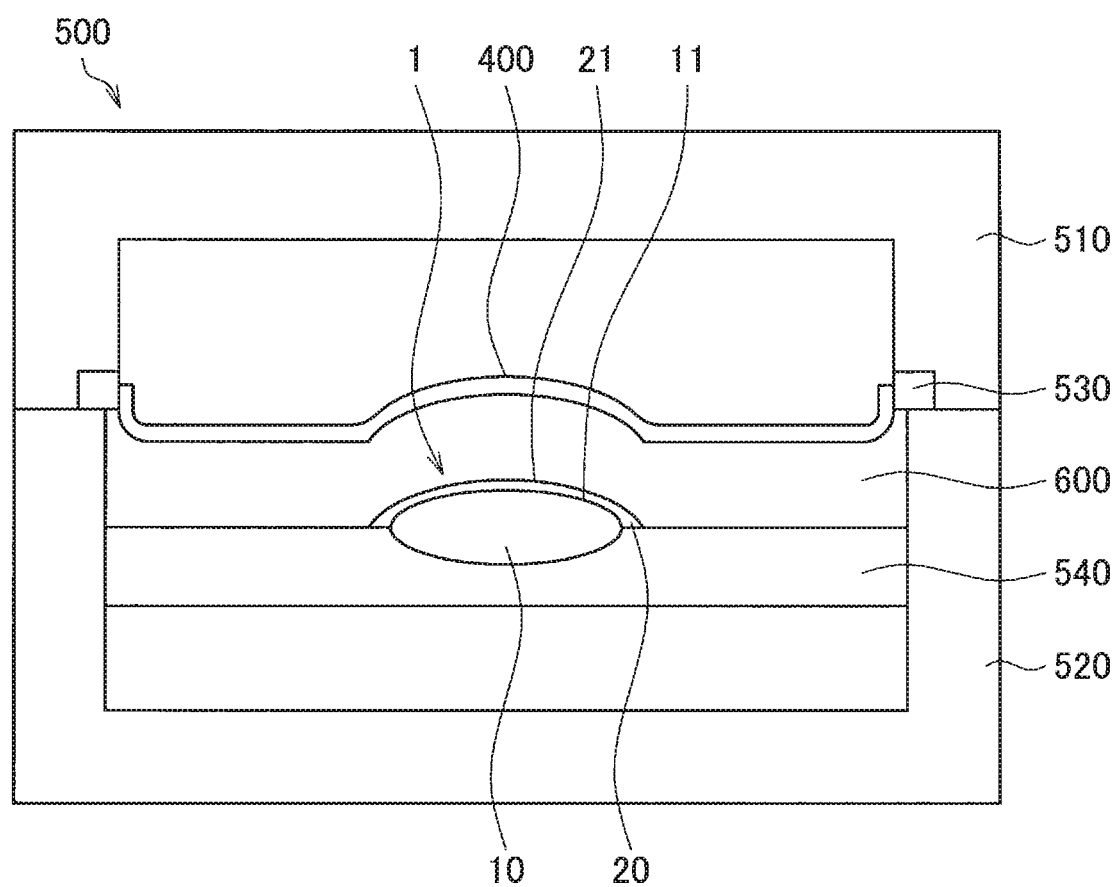
FIG. 8 is a cross-section diagram for describing the method for manufacturing the resin laminated optical body.

Then, as illustrated in FIG. 8, the movable table 540 is moved down to separate the resin laminated optical body 1 from the flexible master 400. Note that, in this step, a separation assisting step for promoting separation of the flexible master 400 and the resin laminated optical body 1 may be performed. Such a separation assisting step includes inserting a blade between the flexible master 400 and the resin laminated optical body 1, blowing gas such as air between the flexible master 400 and the resin laminated optical body 1, and the like.

Thereafter, the space in the chamber device 500 is brought into an atmospheric pressure state, and the upper chamber box 510 is detached. Then, the flexible master 400 and the resin laminated optical body 1 are taken out from the lower chamber box 520. Note that further ultraviolet radiation treatment may be performed for the purpose of promoting curing of the resin layer 20, or heat treatment may be performed for the purpose of relieving stress in the resin layer 20.

Through the above steps, the resin layer 20 can be formed on the curved surface 11 on one side of the optical base material 10. The resin layer 20 may also be formed on the curved surface on the opposite side according to necessity through steps similar to those described above.

Figure 9:
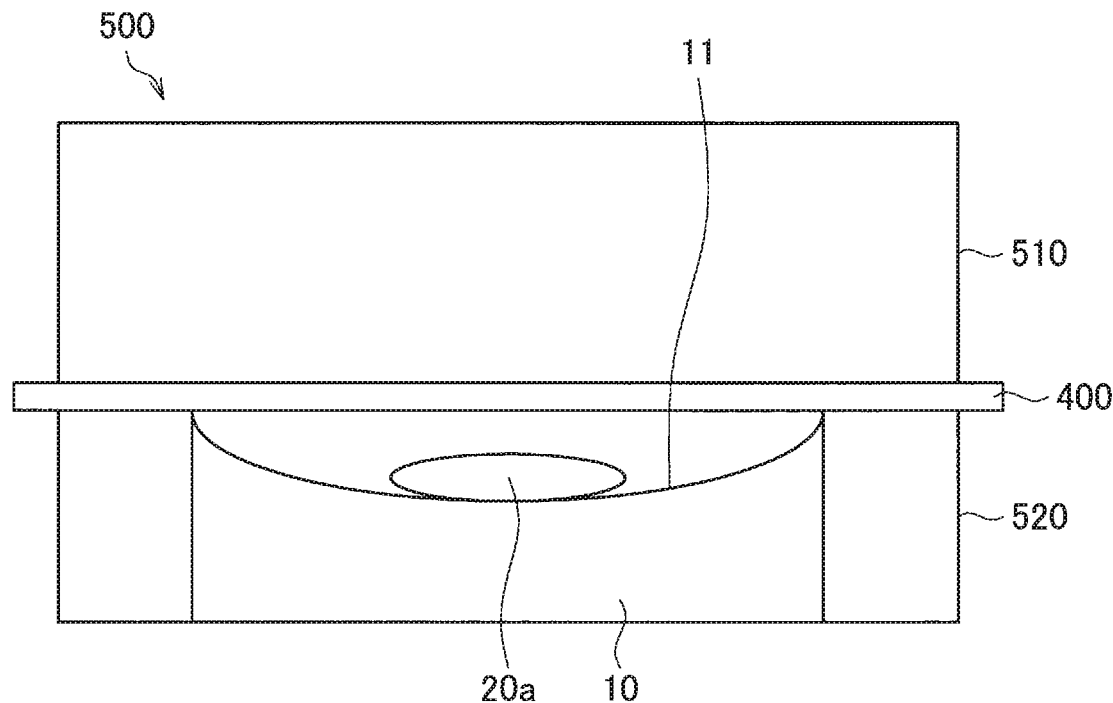
FIG. 9 is a cross-section diagram for describing the method for manufacturing the resin laminated optical body.
Figure 10:
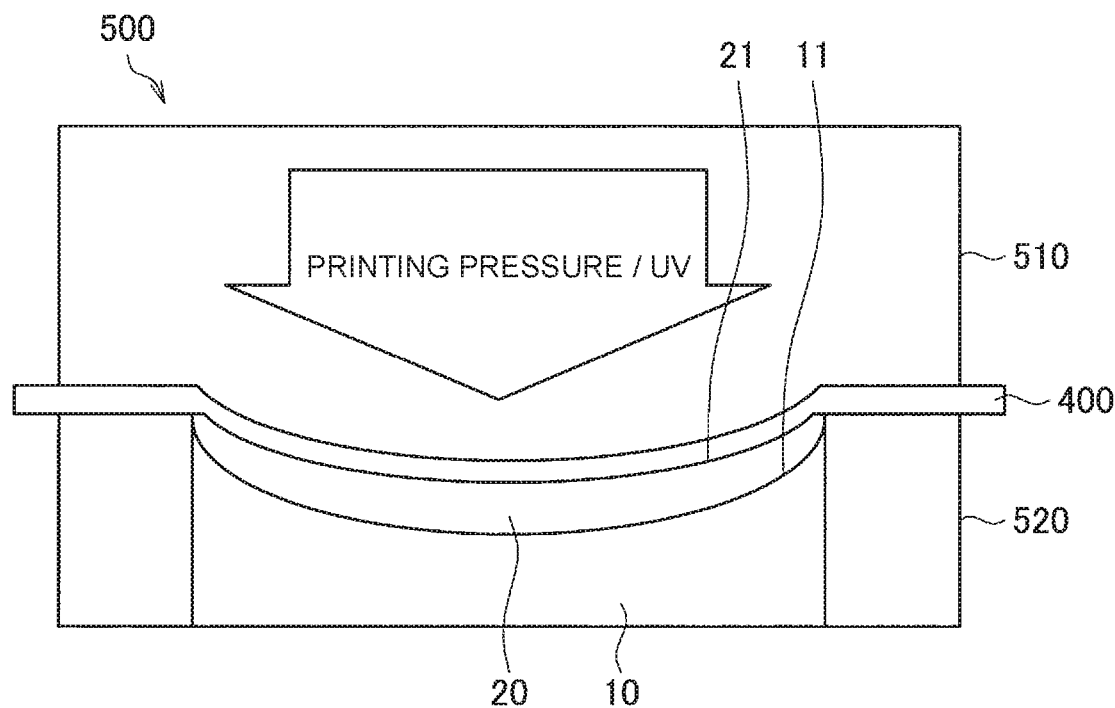
FIG. 10 is a cross-section diagram for describing the method for manufacturing the resin laminated optical body.

Note that, in a case where the optical base material 10 is a concave lens, the resin laminated optical body 1 can also be produced through steps similar to those described above. An overview of steps is illustrated in FIG. 9 and FIG. 10. As illustrated in FIG. 9, the uncured resin layer 20a is formed on the curved surface 11 of the optical base material 10. Then, the optical base material 10 and the flexible master 400 are set in the chamber device 500. Then, the flexible master 400 and the optical base material 10 are brought closer to each other. Then, as illustrated in FIG. 10, a printing pressure is applied to the flexible master 400. An arrow in FIG. 10 indicates the direction of the printing pressure. Through this step, the inverted concave-convex structure 430 of the flexible master 400 is pressed against the uncured resin layer 20a while deforming the flexible master 400. Accordingly, the uncured resin layer 20a spreads across the curved surface 11, and the uncured resin layer 20a enters between micro-convexities of the inverted concave-convex structure 430. Herein, it is preferable not to leave a gap between the uncured resin layer 20a and the flexible master 400 whenever possible. In this state, the uncured resin layer 20a is cured. Specifically, the uncured resin layer 20a is irradiated with ultraviolet rays. Accordingly, the uncured resin layer 20a becomes the resin layer 20, and the inverted concave-convex structure 430 is transferred to the surface of the resin layer 20. That is, an inverted structure of the inverted concave-convex structure 430, that is, the micro concave-convex structure 30 is formed in the surface 21 of the resin layer 20. Through the above steps, the resin laminated optical body 1 is produced.

Herein, in the present embodiment, a shape of the resin layer 20 other than the micro concave-convex structure 30 can be adjusted by adjusting the printing pressure applied to the flexible master 400. The details are as described above. Then, the resin laminated optical body 1 is separated from the flexible master 400, and the flexible master 400 and the resin laminated optical body 1 are taken out from the chamber device 500.

Through the above steps, the resin layer 20 can be formed on the curved surface 11 on one side of the optical base material 10. The resin layer 20 may also be formed on the curved surface on the opposite side according to necessity through steps similar to those described above. According to the method for manufacturing the resin laminated optical body 1 described above, the shape of the resin layer 20, and eventually, the second optical property of the resin laminated optical body 1 can be adjusted by adjusting the printing pressure applied to the flexible master 400. Therefore, the second optical property of the resin laminated optical body 1 can be easily adjusted.

<3. Detailed Structure of Flexible Master and Manufacturing Method>

Next, a detailed structure of the flexible master 400 and a method for manufacturing the same will be described. As illustrated in FIG. 13, the flexible master 400 includes the flexible base material 410, and a resin layer 425 formed on a surface of the flexible base material 410. The flexible base material 410 is a planar base material having flexibility. Examples of the material constituting the flexible base material 410 include acrylic resins (such as poly methyl methacrylate), polycarbonate, polyethylene terephthalate (PET; note that the properties of PET are not particularly specified, and the PET may be amorphous or stretched), triacetyl cellulose (TAC), polyethylene, polypropylene, polycarbonate, cycloolefin polymers, cycloolefin copolymers, vinyl chloride, and the like.

The resin layer 425 includes a curing resin. The type of curing resin is not particularly restricted, and may be a curing resin similar to the curing resin constituting the resin layer 20, for example. The inverted concave-convex structure 430 is formed in the resin layer 425. The inverted concave-convex structure 430 includes large numbers of micro-convexities 430a and micro-concavities 430b.

Next, the method for manufacturing the flexible master 400 will be described. The method for manufacturing the flexible master 400 includes a first master producing step of producing a transfer mold having an inverted structure of the inverted concave-convex structure 430, a second master producing step of forming an uncured resin layer 420 on the surface of the flexible base material 410, and a third master producing step of curing the uncured resin layer 420, and transferring the concave-convex structure of the transfer mold to the resin layer 425 after curing.

(3-1. First Master Producing Step)

Figure 11:
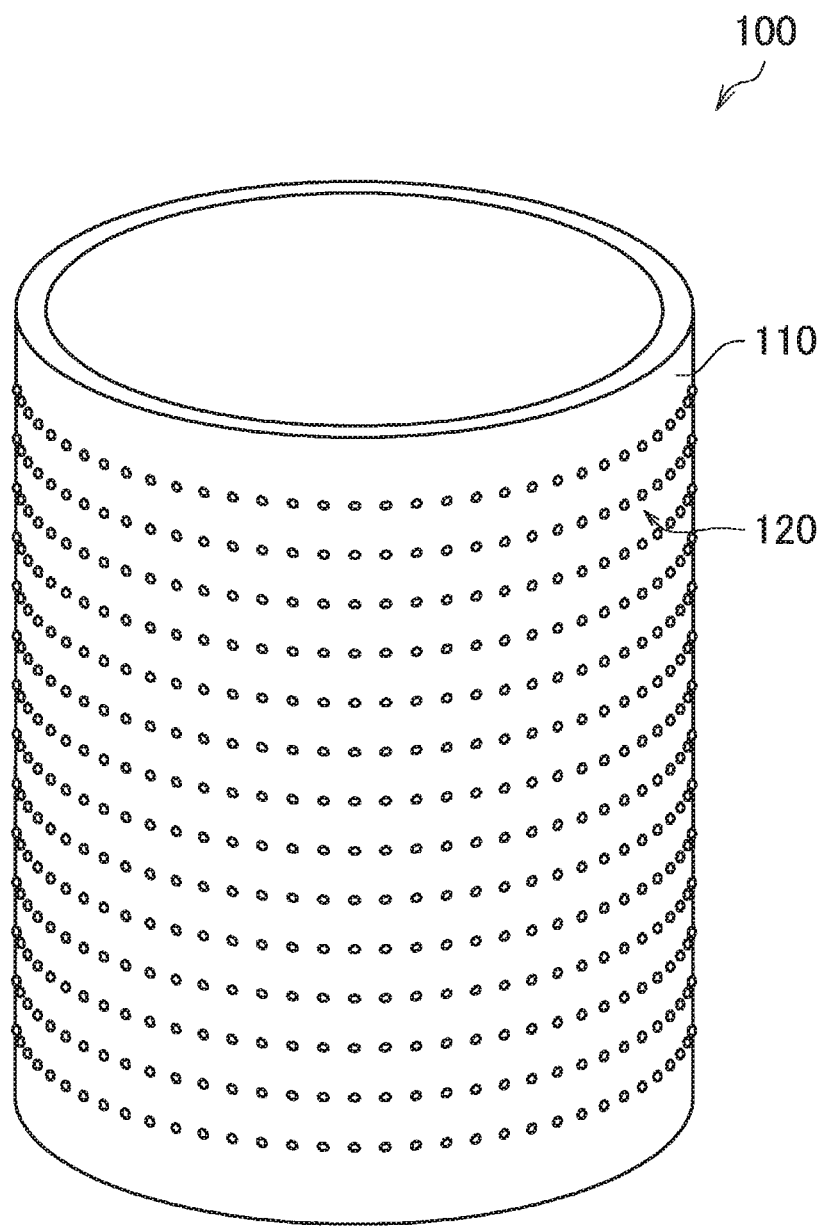
FIG. 11 is a perspective diagram illustrating an exemplary appearance of a master according to the present embodiment.

The first master producing step is a step of producing a transfer mold having the inverted structure of the inverted concave-convex structure 430. The transfer mold is a master 100 illustrated in FIG. 11, for example.

(3-1-1. Configuration of Master)

The configuration of the master 100 will now be described. The master 100 has a cylindrical shape. The master 100 may also have a round columnar shape, or another shape (for example, a planar shape). However, in the case in which the master 100 has a round columnar or cylindrical shape, a concave-convex structure (that is, a master concave-convex structure) 120 of the master 100 can be transferred seamlessly to a resin base material or the like by a roll-to-roll method. The inverted concave-convex structure 430 can thereby be formed on the surface of the flexible base material 410 with high production efficiency. From such a perspective, the shape of the master 100 is preferably a cylindrical shape or a round columnar shape.

The master 100 includes a master base material 110, and the master concave-convex structure 120 formed on the circumferential surface of the master base material 110. The master base material 110 is a glass body, for example, and specifically is formed from quartz glass. However, the master base material 110 is not particularly limited insofar as the $SiO_2$ purity is high, and may also be formed from a material such as fused quartz glass or synthetic quartz glass. The master base material 110 may also be a laminate of the above materials on a metal matrix, or a metal matrix (for example, Cu, Ni, Cr, Al). The shape of the master base material 110 is a cylindrical shape, but may also be a round columnar shape, or another shape. However, as described above, the master base material 110 preferably has a cylindrical shape or a round columnar shape. The master concave-convex structure 120 has an inverted structure of the inverted concave-convex structure 430.

(3-1-2. Method for Manufacturing Master)

Next, a method for manufacturing the master 100 will be described. First, a base material resist layer is formed (deposited) on the master base material 110. Herein, the resist material constituting the base material resist layer is not particularly limited, and may be either an organic resist material or an inorganic resist material. Examples of organic resist materials include novolac-type resist and chemically-amplified resist. In addition, examples of inorganic resist materials include metallic oxides including one or multiple types of transition metals such as tungsten (W) or molybdenum (Mo). Other examples of inorganic resist materials include Cr, Au, and the like. However, in order to conduct thermal reaction lithography, the base material resist layer preferably is formed from a thermo-reactive resist including a metallic oxide.

In the case of using an organic resist material, the base material resist layer may be formed on the master base material 110 by using a process such as spin coating, slit coating, dip coating, spray coating, or screen printing. In addition, in the case of using an inorganic resist material for the base material resist layer, the base material resist layer may be formed using sputtering. An organic resist material and an inorganic resist material may also be used together.

Next, by exposing part of the base material resist layer with an exposure device 200 (see FIG. 12), a latent image is formed on the base material resist layer. Specifically, the exposure device 200 modulates laser light 200A, and irradiates the base material resist layer with the laser light 200A. Consequently, part of the base material resist layer irradiated with the laser light 200A denatures, and thus a latent image corresponding to the master concave-convex structure 120 may be formed in the base material resist layer.

Next, by dripping a developing solution onto the base material resist layer in which the latent image is formed, the base material resist layer is developed. Accordingly, a concave-convex structure is formed in the base material resist layer. Subsequently, by etching the master base material 110 and the base material resist layer using the base material resist layer as a mask, the master concave-convex structure 120 is formed on the master base material 110. Note that although the etching method is not particularly limited, dry etching that is vertically anisotropic is preferable. For example, reactive ion etching (RIE) is preferable. Through the above steps, the master 100 is produced. The etching may be wet etching.

(3-1-3. Configuration of Exposure Device)

Figure 12:
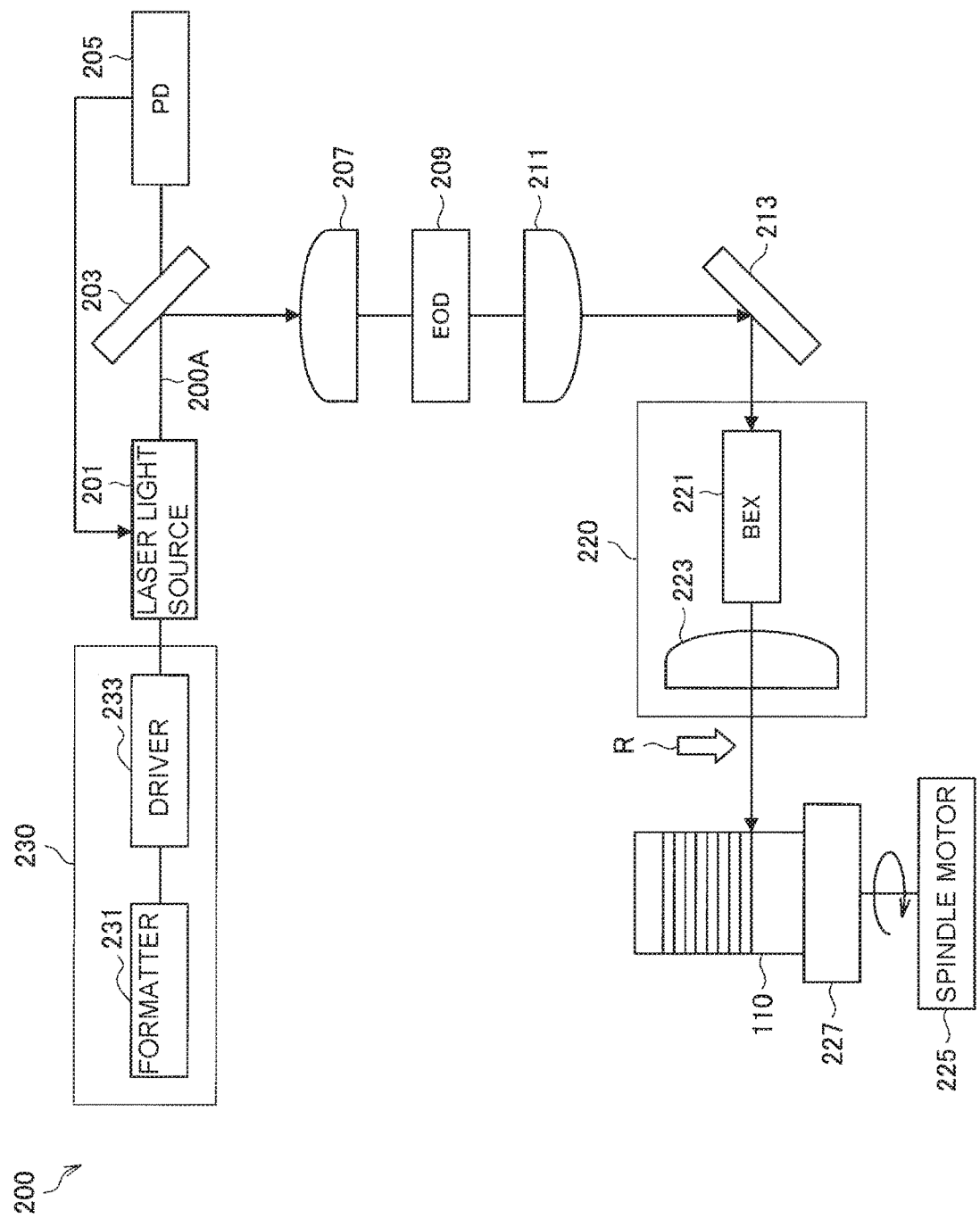
FIG. 12 is a block diagram illustrating an exemplary configuration of an exposure device.

Next, the configuration of the exposure device 200 will be described on the basis of FIG. 12. The exposure device 200 is a device that exposes the base material resist layer. The exposure device 200 includes a laser light source 201, a first mirror 203, a photodiode (PD) 205, a deflecting optical system, a control mechanism 230, a second mirror 213, a movable optical table 220, a spindle motor 225, and a turntable 227. In addition, the master base material 110 is placed on the turntable 227 and is capable of rotating.

The laser light source 201 is a light source that emits the laser light 200A, and is a device such as a solid-state laser or a semiconductor laser, for example. The wavelength of the laser light 200A emitted by the laser light source 201 is not particularly limited, but may be a wavelength in the blue light band from 400 nm to 500 nm, for example. In addition, it is sufficient for the spot diameter of the laser light 200A (the diameter of the spot radiated onto the resist layer) to be smaller than the diameter of the open face of a concavity of the master concave-convex structure 120, such as approximately 200 nm, for example. The laser light 200A emitted from the laser light source 201 is controlled by the control mechanism 230.

The laser light 200A emitted from the laser light source 201 advances directly in a collimated beam, reflects off the first mirror 203, and is guided to the deflecting optical system.

The first mirror 203 is made up of a polarizing beam splitter, and has a function of reflecting one polarized component, and transmitting the other polarized component. The polarized component transmitted through the first mirror 203 is detected by the photodiode 205 and photoelectrically converted. In addition, a photodetection signal photoelectrically converted by the photodiode 205 is input into the laser light source 201, and the laser light source 201 conducts phase modulation of the laser light 200A on the basis of the input photodetection signal.

In addition, the deflecting optical system includes a condenser lens 207, an electro-optic deflector (EOD) 209, and a collimator lens 211.

In the deflecting optical system, the laser light 200A is condensed onto the electro-optic deflector 209 by the condenser lens 207. The electro-optic deflector 209 is an element capable of controlling the radiation position of the laser light 200A. With the electro-optic deflector 209, the exposure device 200 is also capable of changing the radiation position of the laser light 200A guided onto the movable optical table 220 (what is called a Wobble mechanism). After the radiation position is adjusted by the electro-optic deflector 209, the laser light 200A is converted back into a collimated beam by the collimator lens 211. The laser light 200A exiting the deflecting optical system is reflected by the second mirror 213, and guided level with and parallel to the movable optical table 220.

The movable optical table 220 includes a beam expander (BEX) 221 and an objective lens 223. The laser light 200A guided to the movable optical table 220 is shaped into a desired beam shape by the beam expander 221, and then radiated via the objective lens 223 onto the base material resist layer formed on the master base material 110. In addition, the movable optical table 220 moves by one feed pitch (track pitch) in the direction of the arrow R (feed pitch direction) every time the master base material 110 undergoes one rotation. The master base material 110 is placed on the turntable 227. The spindle motor 225 causes the turntable 227 to rotate, thereby causing the master base material 110 to rotate. Accordingly, the laser light 200A is made to scan over the base material resist layer. Herein, a latent image of the base material resist layer is formed along the scanning direction of the laser light 200A.

In addition, the control mechanism 230 includes a formatter 231 and a driver 233, and controls the radiation of the laser light 200A. The formatter 231 generates a modulation signal that controls the radiation of the laser light 200A, and the driver 233 controls the laser light source 201 on the basis of the modulation signal generated by the formatter 231. The irradiation of the master base material 110 with the laser light 200A is thereby controlled.

The formatter 231 generates a control signal for irradiating the base material resist layer with the laser light 200A, on the basis of an input image depicting an arbitrary pattern to be drawn on the base material resist layer. Specifically, first, the formatter 231 acquires an input image depicting an arbitrary draw pattern to be drawn on the base material resist layer. The input image is an image corresponding to a development of the outer circumferential surface of the base material resist layer, in which the outer circumferential surface of the base material resist layer is cut in the axial direction and expanded in a single plane. In the development view, an image corresponding to the circumferential shape of the master 100 is drawn. This image illustrates the inverted structure of the inverted concave-convex structure 430. Note that a transfer film to which the master concave-convex structure 120 of the master 100 has been transferred may be produced, and the inverted concave-convex structure 430 may be formed on the flexible base material 410 using this transfer film as a transfer mold. In this case, the master concave-convex structure 120 has the same concave-convex structure as the inverted concave-convex structure 430.

Next, the formatter 231 partitions the input image into sub-regions of a predetermined size (for example, partitions the input image into a lattice), and determines whether or not the concavity draw pattern (in other words, a pattern corresponding to the concavities of the master 100) is included in each of the sub-regions. Subsequently, the formatter 231 generates a control signal to perform control to irradiate with the laser light 200A each sub-region determined to include the concavity draw pattern. This control signal (that is, the exposure signal) preferably is synchronized with the rotation of the spindle motor 225, but does not have to be synchronized. In addition, the control signal and the rotation of the spindle motor 225 may also be resynchronized every time the master base material 110 performs one rotation. Furthermore, the driver 233 controls the output of the laser light source 201 on the basis of the control signal generated by the formatter 231. The irradiation of the base material resist layer with the laser light 200A is thereby controlled. Note that the exposure device 200 may also perform a known exposure control process, such as focus servo and positional correction of the irradiation spot of the laser light 200A. The focus servo may use the wavelength of the laser light 200A, or use another wavelength for reference.

In addition, the laser light 200A radiated from the laser light source 201 may be radiated onto the base material resist layer after being split into multiple optical systems. In this case, multiple irradiation spots are formed on the base material resist layer. In this case, when the laser light 200A emitted from one optical system reaches the latent image formed by another optical system, exposure may be ended.

Consequently, according to the present embodiment, a latent image corresponding to the draw pattern of the input image can be formed in the resist layer. Then, by developing the resist layer and using the developed resist layer as a mask to etch the master base material 110 and the base material resist layer, the master concave-convex structure 120 corresponding to the draw pattern of the input image is formed on the master base material 110. In other words, an arbitrary master concave-convex structure 120 corresponding to a draw pattern can be formed. Consequently, if a draw pattern in which the inverted structure of the inverted concave-convex structure 430 is drawn is prepared as the draw pattern, the master concave-convex structure 120 having the inverted structure of the inverted concave-convex structure 430 can be formed.

Note that the exposure device usable in the present embodiment is not limited to the exposure device 200, and any type of exposure device having functions similar to those of the exposure device 200 may be used.

(3-1-4. Method for Forming Concave-Convex Structure Using Master)

Next, an example of a method for forming the inverted concave-convex structure 430 using the master 100 will be described with reference to FIG. 13. The inverted concave-convex structure 430 can be formed on the flexible base material 410 by a roll-to-roll transfer device 300 using the master 100. In the transfer device 300 illustrated in FIG. 13, the curing resin constituting the resin layer 425 is what is called an ultraviolet-curing resin. The second and third master producing steps described above are performed using the transfer device 300.

The transfer device 300 includes the master 100, a base material supply roll 301, a take-up roll 302, guide rolls 303 and 304, a nip roll 305, a separation roll 306, an applicator device 307, and a light source 309.

The base material supply roll 301 is a roll around which the long-length flexible base material 410 is wound in a roll, while the take-up roll 302 is a roll that takes up the flexible master 400. In addition, the guide rolls 303 and 304 are rolls that transport the flexible base material 410. The nip roll 305 is a roll that puts the flexible base material 410 on which the uncured resin layer 420 has been laminated, or in other words a transfer film 450, in close contact with the master 100. The separation roll 306 is a roll that separates the flexible master 400 from the master 100.

The applicator device 307 includes applicator means such as a coater, and applies an uncured curing resin to the flexible base material 410, and forms the uncured resin layer 420. The applicator device 307 may be a device such as a gravure coater, a wire bar coater, or a die coater, for example. In addition, the light source 309 is a light source that emits light of a wavelength at which the uncured resin can be cured, and may be a device such as an ultraviolet lamp, for example.

In the transfer device 300, first, the flexible base material 410 is delivered continuously from the base material supply roll 301 via the guide roll 303. Note that partway through the delivery, the base material supply roll 301 may also be changed to a base material supply roll 301 of a separate lot. The uncured resin is applied by the applicator device 307 to the delivered flexible base material 410, and the uncured resin layer 420 is laminated onto the flexible base material 410. The transfer film 450 is thereby prepared. The transfer film 450 is put into close contact with the master 100 by the nip roll 305. The light source 309 irradiates with ultraviolet rays the uncured resin layer 420 put in close contact with the master 100, thereby curing the uncured resin layer 420. Accordingly, the uncured resin layer 420 becomes the resin layer 425, and the master concave-convex structure 120 is transferred to the surface of the resin layer 425. In other words, the inverted structure of the master concave-convex structure 120, that is, the inverted concave-convex structure 430, is formed in the surface of the resin layer 425. Next, the flexible base material 410 in which the inverted concave-convex structure 430 is formed is separated from the master 100 by the separation roll 306. Next, the flexible base material 410 in which the inverted concave-convex structure 430 is formed is taken up by the take-up roll 302 via the guide roll 304. Note that the master 100 may be oriented vertically or oriented horizontally, and a mechanism that corrects the angle and eccentricity of the master 100 during rotation may also be provided separately. For example, an eccentric tilt mechanism may be provided in a chucking mechanism. The transfer may also be performed by pressure transfer.

In this way, in the transfer device 300, the circumferential shape of the master 100 is transferred to the transfer film 450 while transporting the transfer film 450 roll-to-roll. Accordingly, the inverted concave-convex structure 430 is formed on the flexible base material 410.

Note that in the case of using a thermoplastic resin film as the flexible base material 410, the applicator device 307 and the light source 309 become unnecessary. In this case, a heater device is disposed farther upstream than the master 100. The flexible base material 410 is heated and softened by this heater device, and thereafter, the flexible base material 410 is pressed against the master 100. Accordingly, the master concave-convex structure 120 formed on the circumferential surface of the master 100 is transferred to the flexible base material 410. Note that a film including a resin other than a thermoplastic resin may be used as the flexible base material 410, and the flexible base material 410 and a thermoplastic resin film may be laminated. In this case, the laminated film is pressed against the master 100 after being heated by the heater device. Consequently, the transfer device 300 is capable of continuously producing a transfer product in which the inverted concave-convex structure 430 is formed on the flexible base material 410.

In addition, a transfer film to which the master concave-convex structure 120 of the master 100 has been transferred may be produced, and the inverted concave-convex structure 430 may be formed on the flexible base material 410 using this transfer film as a transfer mold. A transfer film to which the concave-convex structure of the transfer film has been transferred further may also be used as a transfer mold. In this case, the master concave-convex structure 120 is formed such that the micro concave-convex structure to be formed in the resin layer 425 is an inverted concave-convex structure. In addition, the master 100 may be duplicated by electroforming, thermal transfer, or the like, and this duplicate may be used as a transfer mold. Furthermore, the shape of the master 100 is not necessarily limited to a roll shape, and may also be a planar master. Besides the method for irradiating resist with the laser light 200A, various processing methods can be selected, such as semiconductor exposure using a mask, electron beam lithography, machining, or anodic oxidation.

EXAMPLES

1. Example 1

Next, examples of the present embodiment will be described. In Example 1, the resin laminated optical body 1 was produced through the following steps.

(1-1. Production of Flexible Master)

By performing the first to third master producing steps described above, the flexible master 400 was produced. Specifically, a PET film having a thickness of 75 μm was prepared as the flexible base material 410. Then, the resin layer 425 was formed on one surface of the flexible base material 410 using the transfer device 300 illustrated in FIG. 13. Herein, the ultraviolet-curing acrylic resin composition SK1120 made by Dexerials Corporation was used as the ultraviolet-curing resin. The inverted concave-convex structure 430 formed on the surface of the resin layer 425 had what is called a moth-eye structure. That is, the micro-convexities 430a and the micro-concavities 430b were arrayed on the surface 21 at an average cycle shorter than or equal to a visible light wavelength.

(1-2. Preparation of Optical Base Material)

A circular plano-convex lens was used as the optical base material 10. Herein, the diameter (φ) of the optical base material 10 was 50 mm, the material was BK7, and the radius of curvature was 102 mm. In addition, the refractive index of the optical base material 10 was 1.52. Herein, the radius of curvature was measured by the three-dimensional measuring equipment UA3P made by Panasonic Corporation, and the refractive index was measured by the Abbe refractometer made by ATAGO CO., LTD. Note that the refractive index was a refractive index corresponding to the wavelength of 587 nm.

(1-3. Preparation of Ultraviolet-Curing Resin)

As the ultraviolet-curing resin constituting the resin layer 20, an acrylic ultraviolet-curing resin having the following composition was prepared. The acrylic ultraviolet-curing resin had a viscosity (cP) when uncured was 1240 cP, and the refractive index was 1.52. Herein, the viscosity was measured by the rotating viscometer made by Brookfield Engineering Laboratories, Inc., and the refractive index was measured by the Abbe refractometer made by ATAGO CO., LTD. after curing. The refractive index was a refractive index corresponding to the wavelength of 587 nm.

Monomer: ARONIX M305 made by Toagosei Co., Ltd.: 45 parts by mass

Oligomer: UV-1700 made by The Nippon Synthetic Chemical Industry Co., Ltd.: 20 parts by mass Reactive diluent: DMAA made by KJ Chemicals Corporation: 30 parts by mass Photopolymerization initiator: Irgacure 184: 5 parts by mass (1-4. Production of Resin Laminated Optical Body)

By performing the first to seventh steps described above, the resin laminated optical body 1 was produced. Herein, the flexible master 400 in which the flexible base material 410 had a thickness of 75 µm was used. The printing pressure (the printing pressure (pressing pressure) applied to the flexible master 400) in the fifth step was 0.2 MPa. The resin laminated optical body 1 was thereby produced. The radius of curvature of the surface 21 of the resin layer 20 was measured by the above-described method to find that the radius of curvature was 111.4 mm. Therefore, the curvature radius ratio R was 1.092. Furthermore, the minimum thickness T1 and the maximum thickness T2 of the resin layer 20 were measured by the above-described method to find that the minimum thickness T1 was 0.062 mm, and the maximum thickness T2 was 0.332 mm. Therefore, the thickness ratio T was 0.187. The three-dimensional measuring equipment UA3P made by Panasonic Corporation was used as the measuring device.

(1-5. Measurement of Focal Length)

As the second optical property, the focal length was evaluated. Specifically, the focal length of the optical base material 10 and the focal length of the resin laminated optical body 1 were measured by the nodal slide method. The above results are collectively shown in Table 1.

2. Example 2

Processing similar to that of Example 1 was performed, except that the printing pressure (the printing pressure (pressing pressure) applied to the flexible master 400) in the fifth step was set at 0.4 MPa. The results are collectively shown in Table 1.

3. Example 3

Processing similar to that of Example 1 was performed, except that the printing pressure (the printing pressure (pressing pressure) applied to the flexible master 400) in the fifth step was set at 0.6 MPa. The results are collectively shown in Table 1.

4. Example 4

Processing similar to that of Example 1 was performed, except that the viscosity of the ultraviolet-curing resin constituting the resin layer 20 was set at 1150 cP and the refractive index was set at 1.57. The results are collectively shown in Table 1. Note that the viscosity and refractive index of the ultraviolet-curing resin were changed by adjusting the compounding ratio of the above-described respective constituents.

5. Example 5

Processing similar to that of Example 1 was performed, except that the thickness of the flexible base material 410 constituting the flexible master 400 was set at 125 µm. The results are collectively shown in Table 1.

6. Example 6

A circular plano-concave lens was used as the optical base material 10. Herein, the diameter (φ) of the optical base material 10 was 50 mm, the material was BK7, and the radius of curvature was 102 mm. In addition, the refractive index of the optical base material 10 was 1.52. Processing similar to that of Example 1 was performed, except that such an optical base material 10 was used. The results are collectively shown in Table 1.

7. Example 7

Processing similar to that of Example 1 was performed, except that the printing pressure (the printing pressure (pressing pressure) applied to the flexible master 400) in the fifth step was set at 0.4 MPa. The results are collectively shown in Table 1.

8. Example 8

Processing similar to that of Example 1 was performed, except that the printing pressure (the printing pressure (pressing pressure) applied to the flexible master 400) in the fifth step was set at 0.6 MPa. The results are collectively shown in Table 1.

9. Example 9

Processing similar to that of Example 1 was performed, except that the printing pressure (the printing pressure (pressing pressure) applied to the flexible master 400) in the fifth step was set at 0.7 MPa. The results are collectively shown in Table 1.

10. Comparative Example 1

As an example of Dry-AR (anti-reflection), 134-nm $ZrO_2$ and 100-nm $MgF_2$ were sequentially deposited by sputtering on the curved surface 11 of the optical base material 10 used in Example 1. The radius of curvature of a Dry-AR composite optical body thus produced was measured, but it was not possible to change the radius of curvature. The results are collectively shown in Table 1.

11. Comparative Example 2

As an example of Wet-AR (anti-reflection), a coating material was applied to the curved surface 11 of the optical base material 10 used in Example 1 to a thickness of 100 nm. The refractive index of the coating material (corresponding to the wavelength of 587 nm) was 1.38. The radius of curvature of a Wet-AR composite optical body thus produced was measured, but it was not possible to change the radius of curvature. The results are collectively shown in Table 1.

12. Comparative Example 3

Processing similar to that of Comparative example 1 was performed, except that the optical base material 10 was changed to that used in Example 6. The radius of curvature of a Dry-AR composite optical body thus produced was measured, but it was not possible to change the radius of curvature. The results are collectively shown in Table 1.

13. Comparative Example 4

Processing similar to that of Comparative example 2 was performed, except that the optical base material 10 was changed to that used in Example 6. The radius of curvature of a Wet-AR composite optical body thus produced was measured, but it was not possible to change the radius of curvature. The results are collectively shown in Table 1.

TABLE 1

| | COMP. EX. 1 | COMP. EX. 2 | EX. 1 | EX. 2 | EX. 3 | EX. 4 | EX. 5 |
|---|---|---|---|---|---|---|---|
| SHAPE OF OPTICAL BASE MATERIAL | CONVEX | CONVEX | CONVEX | CONVEX | CONVEX | CONVEX | CONVEX |
| REFRACTIVE INDEX OF OPTICAL BASE MATERIAL (@587 nm) | 1.52 | 1.52 | 1.52 | 1.52 | 1.52 | 1.52 | 1.52 |
| RADIUS OF CURVATURE OF OPTICAL BASE MATERIAL (mm) | 102 | 102 | 102 | 102 | 102 | 102 | 102 |
| FOCAL LENGTH OF OPTICAL BASE MATERIAL (mm) | 196.1 | 196.1 | 196.1 | 196.1 | 196.1 | 196.1 | 196.1 |
| MATERIAL OF FLEXIBLE BASE MATERIAL | — | — | PET | PET | PET | PET | PET |
| THICKNESS OF FLEXIBLE BASE MATERIAL (μm) | — | — | 75 | 75 | 75 | 75 | 125 |
| REFRACTIVE INDEX OF RESIN | — | — | 1.52 | 1.52 | 1.52 | 1.57 | 1.52 |
| VISCOSITY OF RESIN (cP) | — | — | 1240 | 1240 | 1240 | 1150 | 1240 |
| PRESSING PRESSURE (MPa) | — | — | 0.2 | 0.4 | 0.6 | 0.2 | 0.2 |
| RADIUS OF CURVATURE OF RESIN LAYER (mm) | 102 | 102 | 111.4 | 108.1 | 102.2 | 109.8 | 112.1 |
| CURVATURE RADIUS RATIO R | — (1.000) | — (1.000) | 1.092 | 1.060 | 1.002 | 1.076 | 1.099 |
| MAXIMUM THICKNESS OF RESIN LAYER (mm) | — | — | 0.332 | 0.234 | 0.047 | 0.282 | 0.348 |
| MINIMUM THICKNESS OF RESIN LAYER (mm) | — | — | 0.062 | 0.053 | 0.041 | 0.055 | 0.060 |
| THICKNESS RATIO T | — | — | 0.187 | 0.227 | 0.870 | 0.195 | 0.173 |
| FOCAL LENGTH OF RESIN LAMINATED OPTICAL BODY OR COMPOSITE OPTICAL BODY (mm) | 196.1 | 196.1 | 214.2 | 207.8 | 196.3 | 211.1 | 215.5 |
| | Dry-AR | Wet-AR | | | | | |

| | COMP. EX. 3 | COMP. EX. 4 | EX. 6 | EX. 7 | EX. 8 | EX. 9 |
|---|---|---|---|---|---|---|
| SHAPE OF OPTICAL BASE MATERIAL | CONCAVE | CONCAVE | CONCAVE | CONCAVE | CONCAVE | CONCAVE |
| REFRACTIVE INDEX OF OPTICAL BASE MATERIAL (@587 nm) | 1.52 | 1.52 | 1.52 | 1.52 | 1.52 | 1.52 |

TABLE 1-continued

| | | | | | | |
|---|---|---|---|---|---|---|
| RADIUS OF CURVATURE OF OPTICAL BASE MATERIAL (mm) | 102 | 102 | 102 | 102 | 102 | 102 |
| FOCAL LENGTH OF OPTICAL BASE MATERIAL (mm) | 196.1 | 196.1 | 196.1 | 196.1 | 196.1 | 196.1 |
| MATERIAL OF FLEXIBLE BASE MATERIAL | — | — | PET | PET | PET | PET |
| THICKNESS OF FLEXIBLE BASE MATERIAL (μm) | — | — | 75 | 75 | 75 | 75 |
| REFRACTIVE INDEX OF RESIN | — | — | 1.52 | 1.52 | 1.52 | 1.52 |
| VISCOSITY OF RESIN (cP) | — | — | 1240 | 1240 | 1240 | 1240 |
| PRESSING PRESSURE (MPa) | — | — | 0.2 | 0.4 | 0.6 | 0.7 |
| RADIUS OF CURVATURE OF RESIN LAYER (mm) | 102 | 102 | 112.1 | 109.2 | 106.1 | 102.1 |
| CURVATURE RADIUS RATIO R | — (1.000) | — (1.000) | 1.099 | 1.071 | 1.040 | 1.001 |
| MAXIMUM THICKNESS OF RESIN LAYER (mm) | — | — | 0.342 | 0.253 | 0.162 | 0.035 |
| MINIMUM THICKNESS OF RESIN LAYER (mm) | — | — | 0.054 | 0.042 | 0.038 | 0.032 |
| THICKNESS RATIO T | — | — | 0.158 | 0.166 | 0.235 | 0.915 |
| FOCAL LENGTH OF RESIN LAMINATED OPTICAL BODY OR COMPOSITE OPTICAL BODY (mm) | 196.1 | 196.1 | 215.5 | 209.9 | 204 | 196.3 |
| | Dry-AR | Wet-AR | | | | |

14. Considerations

Examples 1 to 9 have revealed that, by adjusting any of the printing pressure, the thickness of the flexible base material 410, and the viscosity of the ultraviolet-curing resin constituting the resin layer 20, the shape of the resin layer 20, more specifically, the curvature radius ratio R and the thickness ratio T can be adjusted. Furthermore, it has been revealed that, by adjusting the shape of the resin layer 20 in this manner, the focal length can be adjusted. Therefore, according to Examples 1 to 9, the focal length can be adjusted without changing the optical base material 10, which eliminates the need to prepare a plurality of types of metal molds for the optical base material 10 in order to adjust the focal length. Therefore, the manufacturing costs of an optical apparatus are reduced. On the other hand, in each of Comparative examples 1 to 4, the radius of curvature of the optical body as a resultant object was equal to the radius of curvature of the original optical base material 10, and it was not possible to adjust the focal length. Therefore, in a case of intending to adjust the focal length in such an optical body, it is necessary to produce an optical base material using a different metal mold per focal length.

Figure 14:
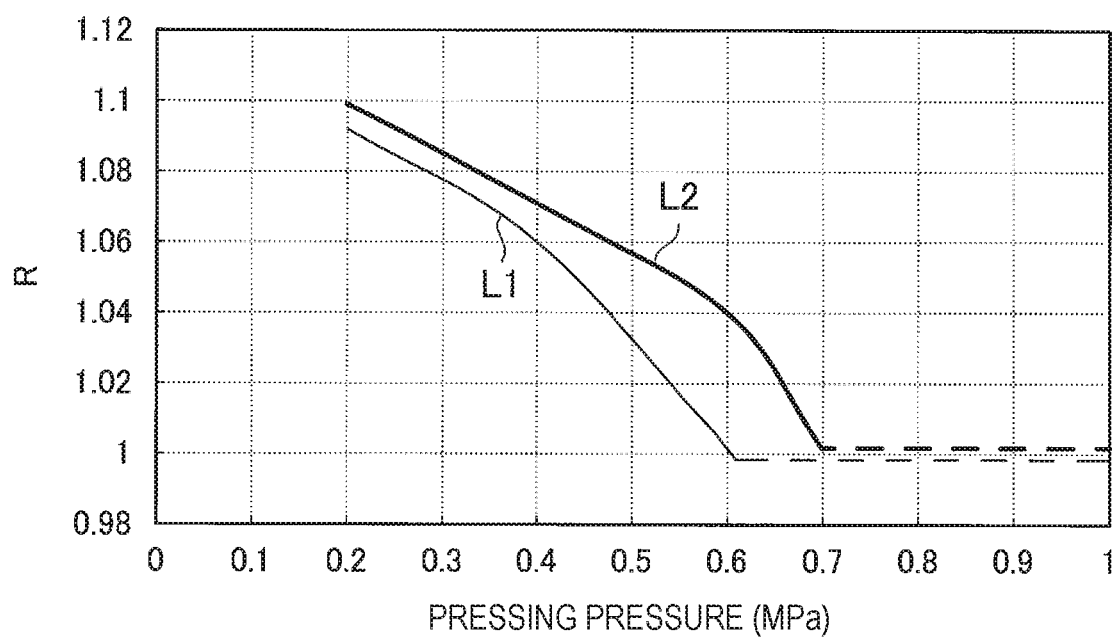
FIG. 14 is a graph illustrating a correspondence relationship between a printing pressure (pressing pressure) (MPa) and R (a ratio between the radius of curvature of a surface of a resin layer and the radius of curvature of a curved surface of an optical base material)
Figure 15:
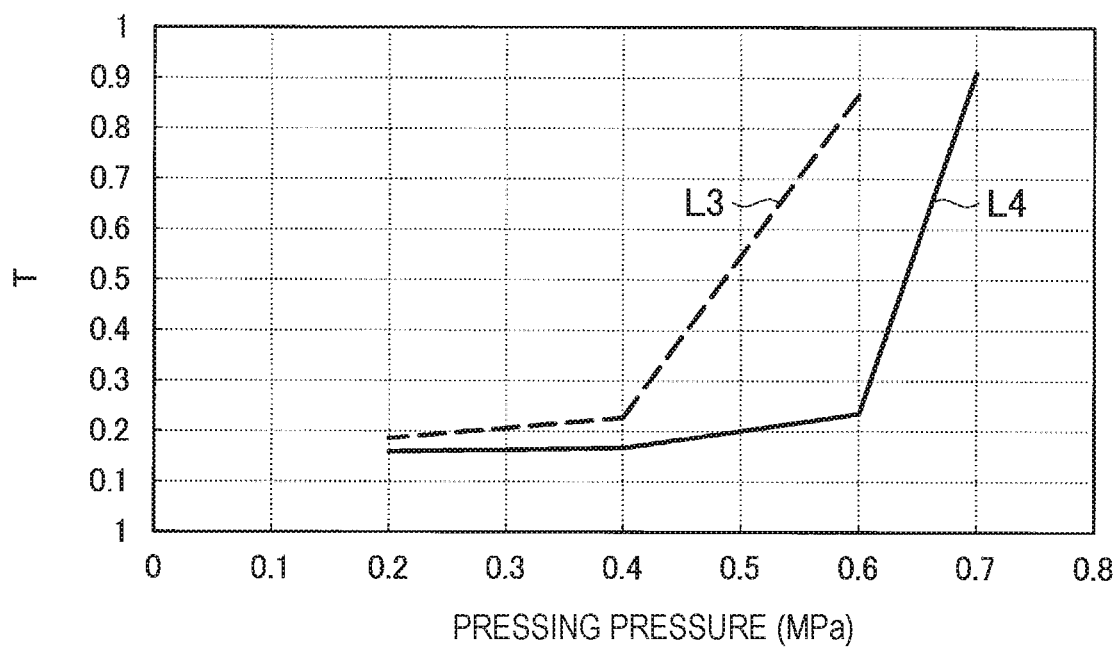
FIG. 15 is a graph illustrating a correspondence relationship between a printing pressure (pressing pressure) (MPa) and T (a ratio between the minimum thickness and maximum thickness of the resin layer).

Next, a correlation between the printing pressure and the curvature radius ratio R or the thickness ratio T was considered on the basis of Examples 1 to 9. The results are illustrated in FIG. 14 and FIG. 15. The horizontal axis indicates the printing pressure (pressing pressure) (MPa), and the vertical axis indicates the curvature radius ratio R or the thickness ratio T. Graphs L1 and L3 indicate results of Examples 1 to 5 (that is, those obtained by using a plano-convex lens as the optical base material 10), and graphs L2 and L4 indicate results of Examples 6 to 9 (that is, those obtained by using a plano-concave lens as the optical base material 10). As is clear from these drawings, the curvature radius ratio R or the thickness ratio T approaches 1 as the printing pressure is increased. That is, the shape of the surface 21 of the resin layer 20 approaches the shape of the curved surface 11 of the optical base material 10. Therefore, by adjusting the printing pressure, the curvature radius ratio R or the thickness ratio T can be adjusted.

The preferred embodiment(s) of the present invention has/have been described above in detail with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 1 resin laminated optical body
10 optical base material
11 curved surface of optical base material
20 resin layer
21 surface of resin layer
30 micro concave-convex structure
30a micro-convexities
30b micro-concavities
400 flexible master
410 flexible base material
425 resin layer
430 inverted concave-convex structure
500 chamber device

The invention claimed is:

1. A resin laminated optical body comprising:
an optical base material having a curved surface; and
a resin layer provided on the curved surface of the optical base material, wherein the resin layer has a curved surface not in contact with the optical base material, wherein
a micro concave-convex structure is formed in the curved surface of the resin layer not in contact with the optical base material,
the resin laminated optical body has a first optical property derived from the micro concave-convex structure and a second optical property derived from a property of the resin layer other than the micro concave-convex structure, the second optical property being different from an optical property of the optical base material, and
a thickness of the resin layer on the optical axis of the optical base material is different from a thickness of the resin layer on an outer edge of the optical base material.

2. The resin laminated optical body according to claim 1, wherein
the second optical property is provided for the resin laminated optical body depending on a shape of the resin layer other than the micro concave-convex structure.

3. The resin laminated optical body according to claim 1, wherein
the surface of the resin layer is a curved surface, and
a radius of curvature of the surface of the resin layer is different from a radius of curvature of the curved surface of the optical base material.

4. The resin laminated optical body according to claim 3, wherein
a ratio R between the radius of curvature of the surface of the resin layer and the radius of curvature of the curved surface of the optical base material is larger than 1.

5. The resin laminated optical body according to claim 1, wherein
a refractive index of the resin layer is different from a refractive index of the optical base material.

6. The resin laminated optical body according to claim 1, wherein
the micro concave-convex structure is any one or more types of a moth-eye structure, a light diffusing structure, a microlens array structure, and a diffraction grating structure.

7. A method for manufacturing the resin laminated optical body according to claim 1, comprising:
a first step of preparing an optical base material having a curved surface;
a second step of forming an uncured resin layer on the curved surface of the optical base material;
a third step of preparing a flexible master having an inverted structure of a micro concave-convex structure formed on a surface and having flexibility;
a fourth step of bringing the flexible master into proximity to the uncured resin layer;
a fifth step of pressing the inverted structure of the flexible master against the uncured resin layer while applying a printing pressure to the flexible master to deform the flexible master; and
a sixth step of curing the uncured resin layer in a state where the inverted structure of the flexible master is pressed against the uncured resin layer to form a resin layer on the curved surface of the optical base material, wherein
in the fifth step, the printing pressure is adjusted to adjust a shape of the resin layer other than the micro concave-convex structure and a distance between the surface of the flexible master and the curved surface of the optical base material has a different value per region of the curved surface of the optical base material, and
an optical property provided for the resin laminated optical body depending on the shape of the resin layer other than the micro concave-convex structure is different from an optical property of the optical base material.

8. The method for manufacturing a resin laminated optical body according to claim 7, wherein
in the fifth step, the printing pressure is adjusted to make a ratio between a minimum distance and a maximum distance between the surface of the flexible master and the curved surface of the optical base material have a value smaller than 1.

9. The method for manufacturing a resin laminated optical body according to claim 7, wherein
in the fifth step, the printing pressure is adjusted to make a radius of curvature of the flexible master have a different value from a radius of curvature of the optical base material.

10. The method for manufacturing a resin laminated optical body according to claim 9, wherein
in the fifth step, the printing pressure is adjusted to make a ratio between the radius of curvature of the flexible master and the radius of curvature of the optical base material have a value larger than 1.

11. The method for manufacturing a resin laminated optical body according to claim 7, wherein
a refractive index of the resin layer is different from a refractive index of the optical base material.

12. The method for manufacturing a resin laminated optical body according to claim 7, wherein
the micro concave-convex structure is any one or more types of a moth-eye structure, a light diffusing structure, a microlens array, and a diffraction grating.

* * * * *